(12) United States Patent
Scherpbier et al.

(10) Patent No.: US 12,337,275 B2
(45) Date of Patent: Jun. 24, 2025

(54) INTERFACIAL SURFACE STRUCTURES FOR CARBON DIOXIDE REMOVAL SYSTEMS

(71) Applicant: AirMyne, Inc., Berkeley, CA (US)

(72) Inventors: Bart Ludo Scherpbier, San Francisco, CA (US); Dominick Yaate Quaye, San Leandro, CA (US); Flynn Corrigan Michael Legg, Oakland, CA (US); Joana Cabrera, Oakland, CA (US); Jun Seon Hong, Berkeley, CA (US); Carlos Guillermo Ramirez, Berkeley, CA (US); Derek Chase Popple, Sacramento, CA (US); Ngoc The Pham, San Jose, CA (US); Mark Patrick Cyffka, El Cerrito, CA (US); Le-Xuan Diec, Berkeley, CA (US); Aryan Johari, San Diego, CA (US); Sudip Mukhopadhyay, Berkeley, CA (US)

(73) Assignee: AirMyne, Inc., Berkeley, CA (US)

( * ) Notice: Subject to any disclaimer, the term of this patent is extended or adjusted under 35 U.S.C. 154(b) by 0 days.

(21) Appl. No.: 18/648,022

(22) Filed: Apr. 26, 2024

(65) Prior Publication Data

US 2025/0058271 A1 Feb. 20, 2025

Related U.S. Application Data

(62) Division of application No. 18/234,280, filed on Aug. 15, 2023, now Pat. No. 12,017,179.

(51) Int. Cl.
*B01D 53/18* (2006.01)
*B01D 53/14* (2006.01)
(Continued)

(52) U.S. Cl.
CPC ....... *B01D 53/185* (2013.01); *B01D 53/1475* (2013.01); *B01D 53/62* (2013.01);
(Continued)

(58) Field of Classification Search
CPC .. B01D 53/185; B01D 53/1475; B01D 53/62; B01D 53/78; B01D 2251/80;
(Continued)

(56) References Cited

U.S. PATENT DOCUMENTS 5,084,249 A 1/1992 Martin
7,056,482 B2 6/2006 Hakka et al.
(Continued)

FOREIGN PATENT DOCUMENTS

CN 110052123 7/2019
WO 2012030630 3/2012
(Continued)

OTHER PUBLICATIONS

Brentwood Counterflow solutions—Cross-Fluted Film Fill, Printed in PDF on Jun. 12, 2023, 5 pages.
(Continued)

*Primary Examiner* — Anita Nassiri-Motlagh
(74) *Attorney, Agent, or Firm* — Henry Patent Law Firm PLLC

(57) ABSTRACT

In a general aspect, interfacial surface structures for removing carbon dioxide from a gaseous feed are presented. In some cases, a method of removing carbon dioxide gas from a gaseous feed includes wetting surfaces of an interfacial surface structure in a gas-liquid contactor with an alkaline capture solution. The gaseous feed containing the $CO_2$ gas is passed across the wetted surfaces of the interfacial surface structure to dissolve the $CO_2$ gas in the alkaline capture solution. A $CO_2$-rich alkaline capture solution is collected from the gas-liquid contactor. The $CO_2$-rich alkaline capture solution includes dissolved $CO_2$ gas from the gaseous feed.

20 Claims, 26 Drawing Sheets

(51) Int. Cl.
    *B01D 53/62* (2006.01)
    *B01D 53/78* (2006.01)

(52) U.S. Cl.
    CPC .......... *B01D 53/78* (2013.01); *B01D 2251/80* (2013.01); *B01D 2252/20494* (2013.01); *B01D 2252/30* (2013.01); *B01D 2252/602* (2013.01); *B01D 2257/504* (2013.01); *B01D 2258/0283* (2013.01)

(58) Field of Classification Search
    CPC ...... B01D 2252/20494; B01D 2252/30; B01D 2252/602; B01D 2257/504; B01D 2258/0283
    USPC ......................................................... 423/226
    See application file for complete search history.

(56) References Cited

U.S. PATENT DOCUMENTS

| | | | |
|---|---|---|---|
| 8,354,086 | B2 | 1/2013 | Murray et al. |
| 9,095,813 | B2 | 8/2015 | Keith et al. |
| 9,452,412 | B2 | 9/2016 | Ausner et al. |
| 9,517,501 | B2 | 12/2016 | Chin et al. |
| 9,919,267 | B2 | 3/2018 | Tanaka et al. |
| 10,201,799 | B2 | 2/2019 | Kehrer |
| 10,376,860 | B2 | 8/2019 | Wehrli |
| 10,449,531 | B2 | 10/2019 | Glover |
| 10,576,423 | B2 | 3/2020 | Ryan et al. |
| 11,504,667 | B2 | 11/2022 | Keith et al. |
| 11,612,853 | B1 | 3/2023 | Mukhopadhyay et al. |
| 11,801,476 | B2 | 10/2023 | Scherpbier et al. |
| 2014/0157856 | A1 | 6/2014 | Chin et al. |
| 2016/0121297 | A1 | 5/2016 | Weh |
| 2016/0250616 | A1 | 9/2016 | Minami et al. |
| 2016/0310894 | A1 | 10/2016 | Tan et al. |
| 2017/0256812 | A1 | 9/2017 | Yoon et al. |
| 2019/0193019 | A1 | 6/2019 | Okano |
| 2022/0176312 | A1 | 6/2022 | Olmstead et al. |
| 2022/0193606 | A1 | 6/2022 | Nold et al. |
| 2022/0362737 | A1 | 11/2022 | Staufcik et al. |
| 2023/0158446 | A1 | 5/2023 | Keith et al. |
| 2023/0213247 | A1 | 7/2023 | Legg et al. |

FOREIGN PATENT DOCUMENTS

| | | |
|---|---|---|
| WO | 2014170184 | 10/2014 |
| WO | 2019161114 | 8/2019 |
| WO | 2019161114 A1 | 8/2019 |

OTHER PUBLICATIONS

USPTO, Restriction Requirement issued in U.S. Appl. No. 18/234,280 on Oct. 16, 2023, 6 pages.
USPTO, Non-Final Office Action issued in U.S. Appl. No. 18/234,280 on Dec. 4, 2023, 67 pages.
USPTO, Notice of Allowance issued in U.S. Appl. No. 18/234,280 on Feb. 28, 2024, 9 pages.
"Structured Packings Energy-efficient, innovative & profitable", www.Sulzer.com obtained Jun. 6, 2023, 20 pages.
Coimbra, Jamille C., et al., "The potential use of a gyroid structure to represent monolithic matrices for bioseparation purposes: Fluid dynamics and mass transfer analysis via CFD", Separation and Purification Technology, vol. 254, 2021, 10 pages, 2021, 10 pages.
Custelcean, Radu , "Direct Air Capture of CO2 using solvents", Annual reviews of Chemical and Biomolecular Engineering, Mar. 18, 2022, Mar. 18, 2022, 21 pages.
Holmes, Geoffrey , et al., "An air-liquid contactor for large-scale capture of CO2 from air", Philosophical Transactions of The Royal Society A, vol. 370, Sep. 10, 2012, pp. 4380-4403, 25 pages.
Mazzotti, Marco , et al., "Direct air capture of CO2 with chemicals: optimization of a two-loop hydroxide carbonate system using a countercurrent air-liquid contactor", Climatic Change, vol. 118, 2013, pp. 119-135, 2013, 17 pages.
McQueen, Noah , et al., "A review of direct air capture (DAC): scaling up commercial technologies and innovating for the future", Progress in Energy, vol. 3, 2021, 22 pages, 2021, 23 pages.
Rahmanian, Nejat , et al., "Effect of Packing Structure on CO2 Capturing Process", chemical engineering transactions vol. 70, 2018, 6 pages.
Rahmanian, Nejat , et al., "Effect of Packing Structure on CO2 Capturing Process", Chemical Engineering Transactions, vol. 70, 2018, pp. 1891-1896, 2018, 6 pages.
Shahid, Muhammad Zubair, et al., "Modeling of CO2-MEA absorption system in the packed column using Sulzer DX structured packing", IOP conferences series: Materials Science and Engineering 736, 022059, 2020, 8 pages.
Shahid, Muhammad Zubair, et al., "Modeling of CO2-MEA absorption system in the packed column using Sulzer DX structured packing", IOP Conference Series: Materials Science and Engineering, vol. 736, 2020, 7 pages, 2020, 8 pages.
Thompson, Jesse , et al., "Advancing Post-Combusting CO2 Capture through increased mass transfer and lower degradation", final technical report to DOE, Dec. 23, 2022, Dec. 23, 2022, 61 pages.
Wang, Chao , et al., "Characterization of novel structured packings for CO2 capture", Energy Procedia 37, 2145-2153, 2013, 9 pages.
Zakeri, Ali , et al., "Characterization of packing materials for CO2 absorption", 1st post combustion capture conference, 2010, 2 pages.
ISA, International Search Report and Written Opinion issued in Application No. PCT/US2024/026638 on Aug. 16, 2024, 13 pages.

| Name | General | | |
|---|---|---|---|
| | Manufacturing Method | Specific Surface Area (m^2/m^3) | Void Fraction |
| Interfacial Surface structure #1 | Thermoforming | 226 | Not Listed: Assume > 0.9 |
| Interfacial Surface structure #2 | 3D Printing | 607 | 0.82 |
| Interfacial Surface structure #3 | 3D Printing | 656 | 0.8536 |
| Interfacial Surface structure #4 | Thermoforming | 508.3 | 0.92 |

FIG. 20A

| | Specific Liquid Mass Retention (SLMR) (kg/m^3) | | | |
|---|---|---|---|---|
| Name | SLMR at 5 seconds (kg/m^3) | SLMR at 15 seconds (kg/m^3) | SLMR at 30 seconds (kg/m^3) | SLMR at 60 seconds (kg/m^3) |
| Interfacial surface structure #1 | 9.21 | 7.97 | 7.54 | 7.20 |
| Interfacial surface structure #2 | 25.60 | 15.12 | 10.03 | 9.23 |
| Interfacial surface structure #3 | 73.48 | 28.51 | 23.17 | 20.62 |
| Interfacial surface structure #4 | 20.62 | 16.90 | 16.56 | 16.06 |

FIG. 20B

INTERFACIAL SURFACE STRUCTURES FOR CARBON DIOXIDE REMOVAL SYSTEMS

CROSS-REFERENCE TO RELATED APPLICATIONS

This application is a divisional of U.S. patent application Ser. No. 18/234,280, filed Aug. 15, 2023, entitled "Interfacial Surface Structures for Carbon Dioxide Removal Systems." The above-referenced priority document is incorporated herein by reference.

TECHNICAL FIELD

The following description relates to interfacial surface structures for carbon dioxide removal systems.

BACKGROUND

Carbon dioxide removal technologies have been used to reduce carbon dioxide emissions in the Earth's atmosphere, with the goal of mitigating anthropogenic climate change caused by such emissions. For example, point source capture technologies have been used to reduce carbon dioxide emissions from flue gas from industrial facilities. As another example, direct air capture (DAC) technologies have been used to remove carbon dioxide from ambient air in the Earth's atmosphere.

BRIEF DESCRIPTION OF THE DRAWINGS

FIG. 20A is a table showing properties of various example interfacial surface structures.

FIG. 20B is a table showing specific liquid mass retention of various example interfacial surface structures at different times.

DETAILED DESCRIPTION

Figure 1:
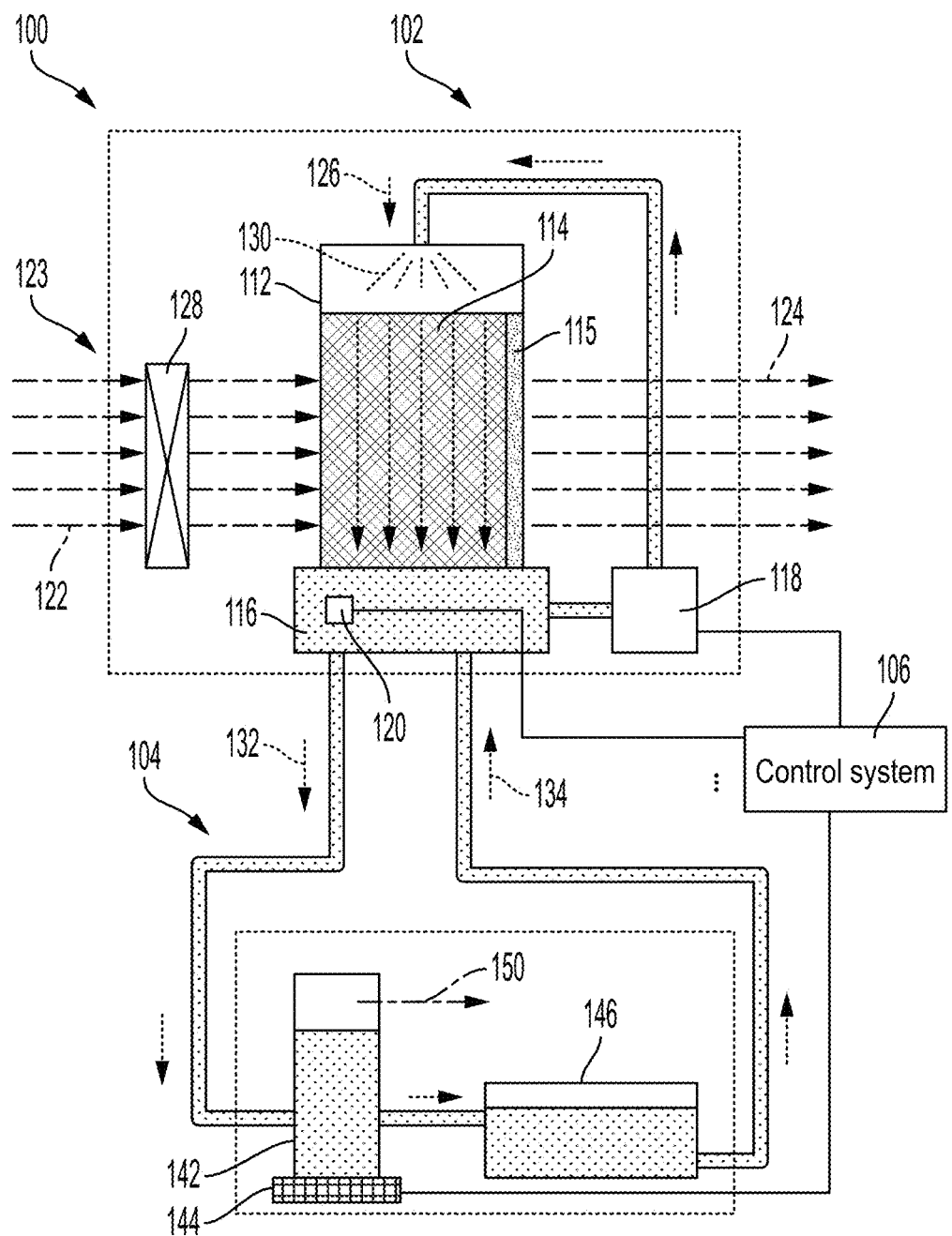
FIG. 1 is a schematic diagram showing aspects of an example carbon processing system.

In some aspects of what is described here, $CO_2$ gas from a gaseous feed (e.g., ambient air and/or flue gas streams) can be captured and removed by operation of a carbon processing system. The gaseous feed can be passed through an interfacial surface structure in a gas-liquid contactor of the carbon processing system, surfaces of which are wetted by an alkaline capture solution. The interfacial surface structure can be configured to operate at low pressure (e.g., a fraction of atmospheric gauge pressure). In some aspects of operation, $CO_2$ gas from the gaseous feed diffuses into a thin layer of the alkaline capture solution on the surfaces of the interfacial surface structure, where it reacts and stays as a complex to form a $CO_2$-rich alkaline capture solution.

In some implementations, the interfacial surface structure forms a reticulated structure. The reticulated structure can include, for example, a network of flow paths, a network of flow directing structures, or a combination of these; such networks can define a regular or periodic geometry. All or part of the reticulated structure is formed by contactor sheets or other types of elements that have periodic surface structures. In some cases, the reticulated structure is formed by contactor sheets having an egg crate profile (as shown, for example, in FIGS. 5, 6, 7), contactor sheets having a jagged wedge profile (as show, for example, in FIG. 8), contactor sheets having interlocking fins (as show, for example, in FIG. 9), contactor sheets having a staggered hemi-ovoid profile (as show, for example, in FIG. 10), materials having an extruded twisting hexagonal structure (FIG. 11), materials having a gyroid lattice structure (FIG. 12), materials having a pyramid profile (FIG. 13), materials having a fishbone profile (FIGS. 19A-19B), or another type of profile. In some implementations, the interfacial surface structure can provide a high specific surface area; enhance liquid retention time for absorbing and separating the $CO_2$ gas from other gases in the gaseous feed; and/or provide an improved mass transfer property.

In some implementations, the systems and techniques described here can provide technical advantages and improvements. For example, the systems and techniques described here may improve mass transfer area per unit volume (e.g., specific surface area); enable efficient carbon dioxide stripping; reduce levelized cost of removing carbon dioxide; improve energy efficiency of a direct carbon removal system; or a combination of these. In some cases, the efficiency of a carbon dioxide removal system can be optimized or otherwise improved by engineering interfacial surface structures that have specified properties. For instance, the liquid retention time, the specific surface area, or a combination of these and possibly other parameters can be designed as described below to improve the efficiency of carbon dioxide removal systems, in some cases. In some systems, mass transfer area per unit volume and other performance metrics can be improved by an interfacial surface structure having a specific liquid mass retention at sixty seconds ($SLMR_{t=60s}$) in a range (e.g., 10-300 kilogram per cubic meter $kg/m^3$ or another range), a specific surface area in a specified range (e.g., 400-5000 square meters per cubic meter ($m^2/m^3$) or another range), or a combination of these and other properties. In some instances, the systems and techniques can also produce valuable carbon dioxide streams for fuel and chemical synthesis, as a low global warming refrigerant, or other applications. In some cases, a combination of these and potentially other advantages and improvements may be obtained.

FIG. 1 is a block diagram showing aspects of an example carbon processing system 100. As shown in FIG. 1, the example carbon processing system 100 includes a first reactor 102, a second reactor 104, and a control system 106. The first reactor 102 includes a gas-liquid contactor 112 which includes an interfacial surface structure 114, a first reservoir 116, a pump 118, a monitoring unit 120, and an air mover 128. The first reactor 102 is configured to perform an absorption reaction. The second reactor 104 includes a stripping column 142, a heating unit 144, and a second reservoir 146. The second reactor 104 is configured to perform a desorption reaction. In some implementations, the example carbon processing system 100 is used to receive a gaseous feed containing carbon dioxide ($CO_2$) gas and strip the $CO_2$ gas from the gaseous feed using an alkaline capture solution. In some instances, when the gaseous feed is drawn from ambient air, the example carbon processing system may operate as a direct air capture (DAC) system configured to directly remove $CO_2$ gas from the ambient air. In some instances, when the gaseous feed includes a flue gas stream (e.g., from an industrial system or another source), the example carbon processing system may operate as a post combustion capture (PCC) system or point source system configured to remove $CO_2$ gas from the flue gas. In some instances, the example carbon processing system 100 may be used to process other types of gaseous feeds (e.g., a hybrid stream or an alternating stream of ambient air and flue gas, etc.). The carbon processing system 100 may include additional or different features, and the components of the carbon processing system 100 may operate as described with respect to FIG. 1 or in another manner.

In some implementations, the gas-liquid contactor 112 in the first reactor 102 includes an interfacial surface structure 114. The interfacial surface structure 114 may be configured to provide a high specific surface area, a high specific liquid mass retention of the liquid phase (e.g., the alkaline capture solution) on the surfaces of the interfacial surface structure 114, a uniform distribution of phases (e.g., the alkaline capture solution and gaseous feed), an efficient mass transfer, a low pressure loss, efficient carbon dioxide stripping, or any combination of some or all of these properties. In some cases, the interfacial surface structure 114 includes a reticulated structure defined by a cascade of contactor sheets. In some instances, contactor sheets may be packed with one another and separated by respective gaps defined by spacers (e.g., the spacers 1400 in FIG. 14) defining spacings between neighboring contactor sheets. In some instances, the contactor sheets may be aligned to one another and securely mounted on one or more alignment rails (e.g., the alignment rail 1604 in FIG. 16). The contactor sheets can be assembled and arranged in the gas-liquid contactor 112 according to the gas flow and the liquid flow. For example, the extension direction of the contactor sheets may be in parallel with both directions of the gas flow and the liquid flow. In some implementations, the contactor sheets are easy to assemble to facilitate a homogenous gas and liquid distribution that avoids premature local flooding and pressure loss.

In some implementations, each contactor sheet includes a periodic surface structure in the form of elevated portions and recesses. In some implementations, the height of the elevated portions and recesses is larger than the thickness of the contactor sheet. In some instances, sizes and shapes of the periodic surface structures of the contactor sheets and spacings between neighboring contactor sheets are designed to reduce pressure drop, to improve turbulence and mixing, to increase randomness of wetting, and to provide other advantages. The elevated portions and recesses of the contactor sheets when assembled form channels where the liquid and gas phases can flow and contact each other. Shapes and dimensions of the channels may be defined, at least in part, by the periodic surface structures and the spacings between neighboring contactor sheets. For example, the elevated portions or recesses may have a shape of pyramids, truncated pyramids, cones, truncated cones, partial spheres, or other profiles. In some instances, each contactor sheet of the reticulated structure of the interfacial surface structure 114 has an egg crate profile (FIGS. 5-7), a jagged wedge profile (FIG. 8), interlocking fins (FIG. 9), a staggered hemi-ovoid profile (FIG. 10), a pyramid profile (FIG. 13), or another type of profile. In some instances, the interfacial surface structure 114 may include a combination of contact sheets having profiles distinct from one another.

In some instances, each contactor sheet of the reticulated structure of the interfacial surface structure 114 in the gas-liquid contactor 112 can be manufactured individually. For example, each contactor sheet can be produced using a compression molding process, an injection molding process, a screen-printing process, a hot melt process, a vacuum molding process, a lamination process, additive manufacturing, sheet metal bending, an extrusion process, or other types of processes. In some instances, each contactor sheet of the interfacial surface structure 114 includes a thermoplastic material. For example, each contactor sheet of the interfacial surface structure 114 includes one or more of the following Polyethylene Polyvinyl Chloride (PVC), Polypropylene, Polyethylene terephthalate (PET), Polystyrene, Acrylonitrile butadiene styrene (ABS), or other types of thermoplastic material. In some instances, each contactor sheet of the interfacial surface structure 114 includes epoxide polymer, acrylic polymer, or another polymer. In some instances, the reticulated structure of the interfacial surface structure 114 can be produced using a 3D printing process, an electrospinning process, a cold-spray process, or another type of manufacturing process.

In some implementations, the interfacial surface structure can be manufactured by developing computer aided design (CAD) file, processing the CAD file with a 3D slicer, and printing the file with a stereolithography 3D printer. In some instances, the 3D printing process can be implemented to fabricate the interfacial surface structure shown in FIGS. 11, 12, 19A-19B or other types of interfacial surface structures.

In some implementations, surfaces of the interfacial surface structure 114 may be modified or treated to increase surface area, increase hydrophilicity, improve chemical resistance, etc. In some instances, the interfacial surface structure 114 may be coated with one or more of a corrosive resistance coating, a hydrophilic coating, an antifouling coating or other types of surface coatings. Techniques that can be used to modify the surfaces of the interfacial surface structure 114 include flame treatment, plasma treatment, sand polish, mechanical polishing, scrapping, etching, or other surface treatment processes. In some implementations, the surface treatment process is used to increase the surface area and to improve adhesion between the surface coating and the interfacial surface structure 114, e.g., by including an intermediate layer between the surface coating and the surfaces of the interfacial surface structure 114. In some implementations, the interfacial surface structure 114 has a specific surface area in a range of 400-5000, 500-3000, 1000-2000 $m^2/m^3$ or in another range. A specific surface area characterizes a total surface area of the interfacial surface structure in a unit volume. In some implementations, the surfaces of the interfacial surface structure are hydrophilic which have a water contact angle in a range of 20-85 degrees or in another range.

The specific liquid mass retention (SLMR) of an interfacial surface structure describes the mass of liquid held within the interfacial surface structure divided by the perimeter volume of the interfacial surface structure as a function of time. To collect the SLMR of an interfacial surface structure at a given time, a unit of the structure measuring 0.153 meters in the x and y direction and 0.306 meters in the z direction is submerged in a reservoir filled with water at room temperature and ambient pressure. Three seconds after the top plane of the structure is submerged, the structure is removed from the reservoir. The removal of the structure takes less than one second. The moment the bottom plane of the structure clears the water, a timer begins with initial time at 0 seconds. After a given amount of time, the interfacial surface structure is placed within a bucket on a scale. The bucket is necessary to capture the mass of any water that continues to leave the structure after the measurement time has passed. The mass of the interfacial surface structure, and the water is recorded. The mass of the dry interfacial surface structure is subtracted from this measurement, so that the difference represents that mass of water in the interfacial surface structure at the given time. This mass is divided by the perimeter volume of the surface structure to calculate the SLMR at the given time of measurement. In some implementations, the specific liquid mass retention of an interfacial surface structure characterizes the mass transfer property of the interfacial surface structure, which is determined by the specific surface area, structure, surface properties (e.g., hydrophobicity, roughness, etc.), and other properties of the interfacial surface structure. In some implementations, the interfacial surface structure 114 has a specific liquid mass retention at sixty seconds ($SLMR_{t=60s}$) in a range of 10-300 $kg/m^3$, a specific liquid mass retention at thirty seconds ($SLMR_{t=30s}$) in a range of 15-410 $kg/m^3$, a specific liquid mass retention at fifteen seconds ($SLMR_{t=15s}$) in a range of 18-465 $kg/m^3$, and a specific liquid mass retention at five seconds ($SLMR_{t=5s}$) in a range of 20-500 $kg/m^3$. Implementations of the second example may include one or more of the following features.

In some implementations, surfaces of the contact sheets are wetted by gravity-driven downward flow of the alkaline capture solution 126, and the gaseous feed 122 cross flows within the spacings or channels (e.g., defined between neighboring contactor sheets) of the interfacial surface structure 114. The ascending gas phase and the descending liquid phase, e.g., the gaseous feed 122 and the alkaline capture solution 126, are brought into contact in channels and on the surfaces of the interfacial surface structure 114. During this contact, the $CO_2$ gas in the gaseous feed 122 can transfer into the alkaline capture solution on the surfaces of the interfacial surface structure 114; and mass transfer between phases is facilitated by the interfacial surface structure 114.

As shown in FIG. 1, the alkaline capture solution 126 can be pumped by the pump 118 and distributed, for example, by operation of nozzles or other types of liquid distributors 130, residing above the interfacial surface structure 114 in the gas-liquid contactor 112. The alkaline capture solution 126 descends along the surfaces of the interfacial surface structure 114 forming wetted surfaces. In some implementations, the liquid distributors 130 are configured to provide better distribution of the alkaline capture solution 126, and thus a better wetting of the surface of the interfacial surface structure 114 and allows a better utilization of the existing geometrical surface for the mass transfer. For example, by spraying the alkaline capture solution from above the interfacial surface structure 114 using nozzles (e.g., the nozzles 1802 in FIG. 18), that evenly distributes the alkaline capture solution 126 to all the surfaces of the interfacial surface structure, which in turn can improve the contact area between the alkaline capture solution 126 flowing down along the surface of the interfacial surface structure 114 and the gaseous feed 122 flowing through the interfacial surface structure 114. In some instances, the alkaline capture solution 126 can be distributed by the liquid distributor 130 onto the interfacial surface structure 114 through a pulsing and intermittent spray or a continuous spray, by operation of the pump 118, the liquid distributor 130, and the control system 106.

In the example shown, the $CO_2$ gas in the gaseous feed 122 dissolves into the alkaline capture solution 126 and forms a $CO_2$-rich alkaline capture solution. The $CO_2$ concentration of the $CO_2$-rich alkaline capture solution is continuously measured and quantitively monitored, using a monitoring device 120 (e.g., a $CO_2$ concentration sensor and a temperature sensor) or another technique (e.g., sampling the solution and performing a gas chromatography). In response to the $CO_2$ concentration being less than a threshold value, the $CO_2$-rich alkaline capture solution is collected from the interfacial surface structure 114 in the first reservoir 116 and further continuously circulated by the pump 118 back to the gas-liquid contactor 112 and over the interfacial surface structure 114. In response to the $CO_2$ concentration being greater than or equal to the threshold value, the circulation of the $CO_2$-rich alkaline capture solution over the interfacial surface structure 114 is stopped; and the $CO_2$-rich alkaline capture solution 132 with a $CO_2$ concentration greater than or equal to the threshold is transported to the second reactor 104 and the stripping column 142.

In some implementations, the monitoring device 120 may be configured to perform other types of sensing in the first reservoir 116, including liquid level sensing, density sensing, pH sensing, liquid or gas flow sensing, temperature sensing, purity sensing, and weight sensing. In some instances, the monitoring device 120 may include measurement or analytical instrumentation such as in-situ Raman or infrared (IR) spectroscopy for yield sensing, gas chromatography, mass spectrometry, an autotitrator, or other types of monitoring devices.

Figure 3A:
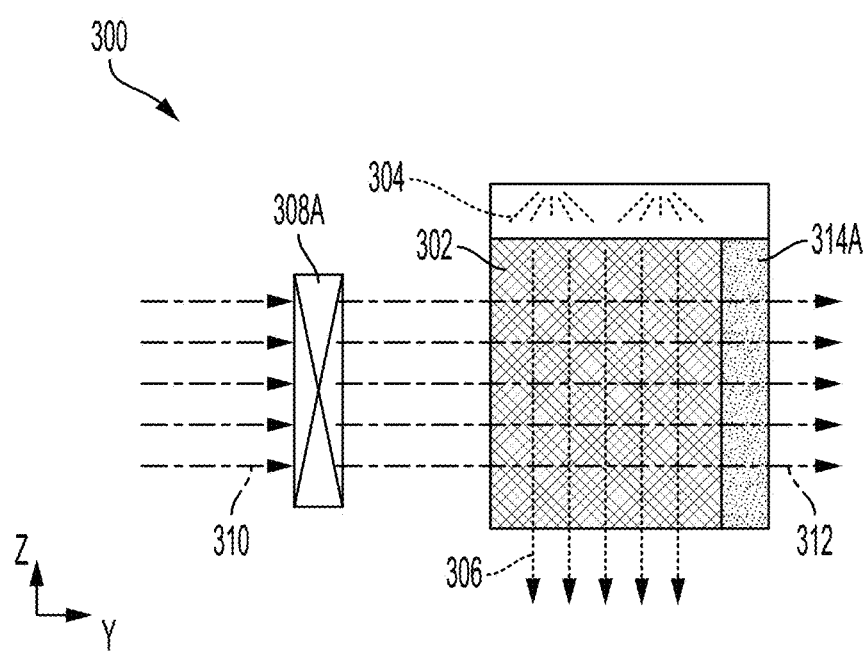
FIG. 3A is a schematic diagram showing aspects of an example gas-liquid contactor.
Figure 3B:
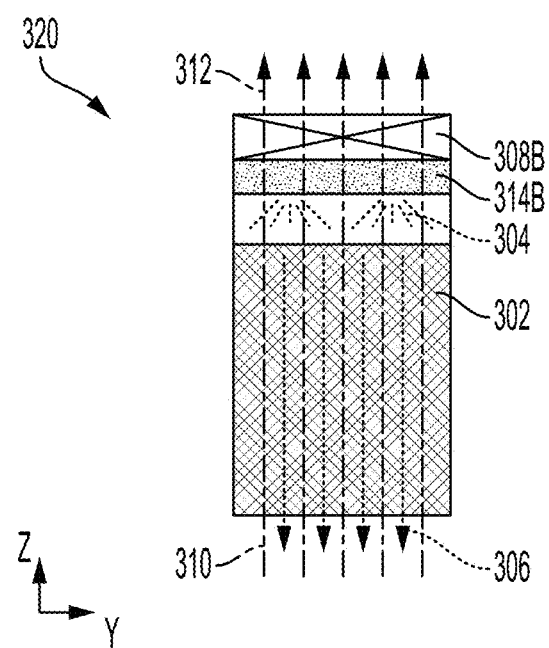
FIG. 3B is a schematic diagram showing aspects of another example gas-liquid contactor.
Figure 3C:
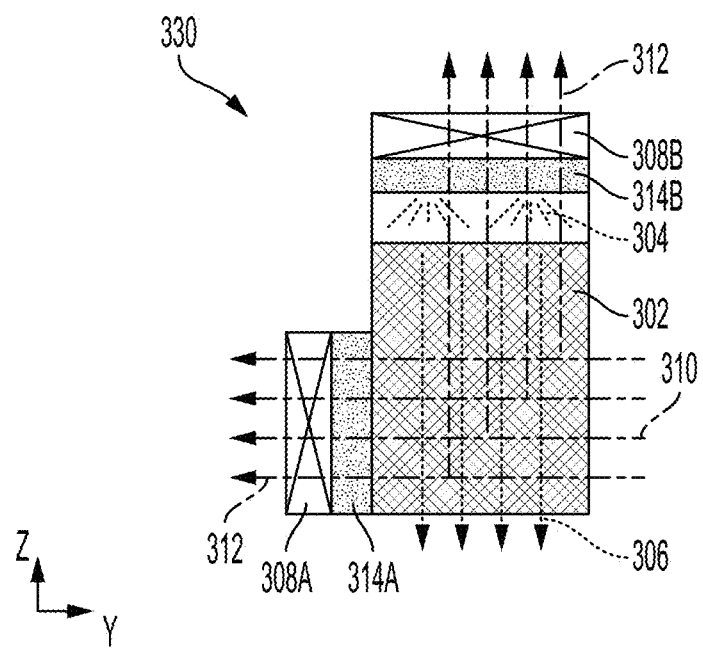
FIG. 3C is a schematic diagram showing aspects of another example gas-liquid contactor.
Figure 17A:
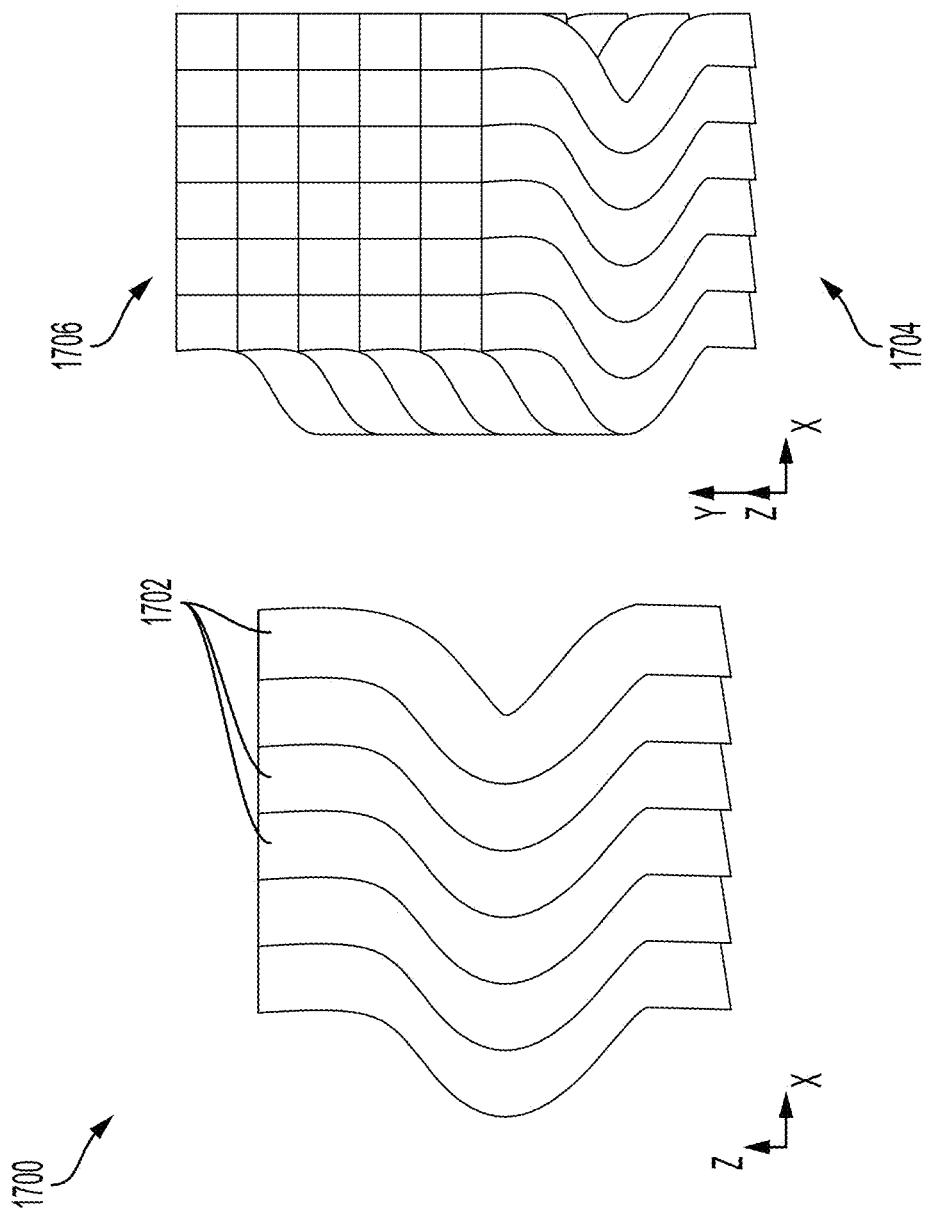
FIG. 17A is a diagram of an example demister separator.
Figure 17B:
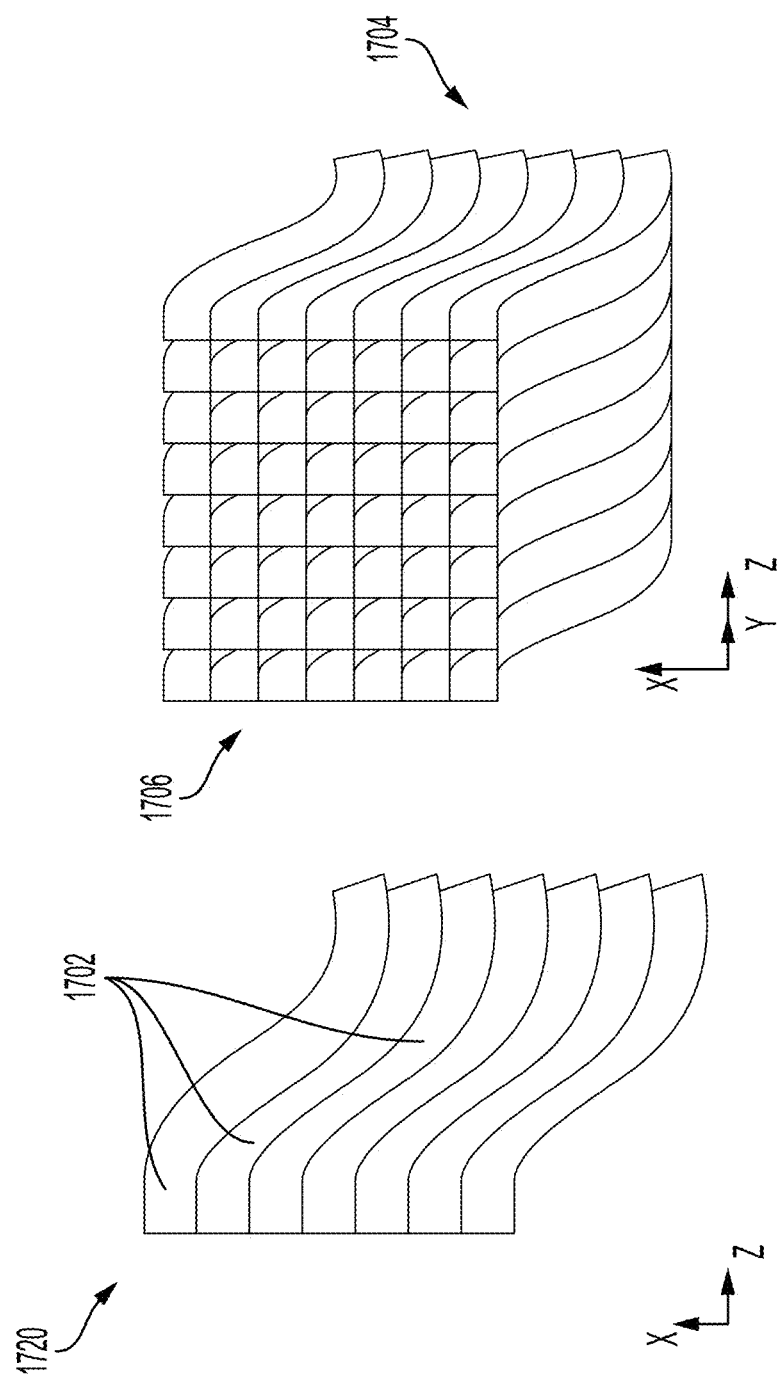
FIG. 17B is a diagram of another example demister separator.

In some implementations, the air mover 128 is configured to move the gaseous feed 122 over the interfacial surface structure 114 and produce gaseous exhaust 124. In particular, the example air mover 128 in FIG. 1 moves the gaseous feed 122 across the wetted surfaces of the interfacial surface structure 114, where the $CO_2$ gas is captured and dissolved in the alkaline capture solution 126. In some implementations, the $CO_2$ concentration in the gaseous exhaust 124 is less than that in the gaseous feed 122. In some instances, the gaseous exhaust 124 can be released from the gas-liquid contactor 112. In some implementations, mist in the gaseous exhaust can be aggregated into liquid droplets in a demister separator 115, which can be returned back the first reservoir 116. In some instances, the demister separator 115 may be configured in another manner relative to the interfacial surface structure 114 according to the configuration of the air mover 128. For example, the demister separator 115 may be implemented as the demister separator 314A, 314B as shown in FIGS. 3A-3C, the demister separator 1700, 1720 as shown in FIGS. 17A-17B, or in another manner. In certain instances, the gaseous exhaust 124 is carbon dioxide stripped air. In some instances, the air mover 128 includes at least one of a compressor, a blower, a fan, a turbofan, a pump, a diaphragm pump, or a heating, ventilation, or air conditioning (HVAC) system. In some instances, the air mover 128 may be configured as a horizontal air mover 308A, a vertical air mover 308B or a combination as shown in FIGS. 3A-3C or in another manner.

In some implementations, the alkaline capture solution 126 is an aqueous solution containing a dissolved salt in a form of a [Q+]b[X−]. The symbol "Q" represents cation species, including $NH_4^+$, $N(CH_3)_4^+$, $N(ethyl)_4^+$, $N(Butyl)_4^+$, $N(Propyl)_4^+$, $K^+$, $Na^+$, $Ca^{2+}$, and $Mg^{2+}$. The symbol "X" represents anion species including $OH^-$, $O^{2-}$, $CO_3^{2-}$, $HCO_3^-$, $Cl^-$, $Br^+$, and $I^+$. The symbols "a" and "b" are integers such that the total charge of the water containing the dissolved salt is neutral. In some instances, the alkaline capture solution 126 may include water, alcohol, glycols, glycerol, polyglycols, glycol ethers, or other chemicals. In some instances, the water may include gray water, brackish water, saline water, or ocean water. In some implementations, the alkaline capture solution 126 includes a weak base of the general formula of $(M)_x(CO_3)_y$ and or $M_x(OH)_y$, where M may include potassium (K), sodium (Na), ammonium ($NH_4$), quaternary ammonium, vanadium (V), platinum (Pt), palladium (Pd), rhodium (Rh), ruthenium (Ru), chromium (Cr), copper (Cu), calcium (Ca), lithium (Li), bismuth (Bi), nickel (Ni), cobalt (Co), manganese (Mn), iron (Fe), molybdenum (Mo), or other ions. The weak base in the alkaline capture solution 126 has a weight concentration in a range of 0.0001-100% in the alkaline capture solution 126. In some implementations, the alkaline capture solution 126 further includes a free amino acid. In some implementations, the alkaline capture solution 126 includes a carboxylic acid salt of amino acids dissolved in water with a weight concentration of 0.0001-100%, 0.001-80%, 0.01-60%, 0.1-40%, 1-20%, or another range.

In some implementations, the alkaline capture solution 126 further includes an anti-corrosive agent, an anti-foaming agent, additives, or promoters. The anti-corrosive agent includes vanadium pentoxide or other metallic oxides; and the additives or promoters include MEA (monoethanolamine), DEA (diethanolamine), TEA (triethanolamine), MDEA (methyl diethanolamine), piperazine, glycine, or other free amines, $KVO_3$ (potassium metavanadate), or another type of material. The anti-foaming agent includes inert liquid chemicals such as mineral oil, silicon, and/or hydrophobic polyol, a hydrophobic solid, such as hydrophobic silica, ethylene-bis-stearamide, fatty acid, and/or fatty alcohol. In some instances, the anti-foaming agent is insoluble in the alkaline capture solution. In some instances, the anti-foaming agent may be silicone based or non-silicon based. In some implementations, the alkaline capture solution 126 includes a phase transfer catalyst or agent with the structure in a form of $c[M^+]d[Y^-]$. The phase transfer catalysts are added to the alkaline capture solution 126 to reduce interfacial surface tension and promote mixing in gas-liquid or gas-liquid-solid systems. The symbol "M" represents cation species; and the symbol "Y" represents anion species. The symbols "c" and "d" are integers such that the total charge is neutral. In some implementations, the phase transfer catalyst has a form of $M-O-(OH)_x$, where M is Pt, Pd, Ru, V, Cu, Al, Cr, Co, Ni, Mo, and Ti. In some instances, the phase transfer catalyst in the alkaline capture solution 126 may be an aqueous ionic base in a form of $M^+Y^-$, where M includes tetrabutyl ammonium, tetramethylammonium, trimethyl butyl ammonium, ethyltrimethyl ammonium, ethyl methyl butyl ammonium, diethyl dimethyl ammonium or other alkylammonium species; and Y includes hydroxide ($OH^-$), fluorine ($F^-$), carbonate ($CO_3^{2-}$), bicarbonate ($HCO_3^-$), or other anion. In some implementations, the phase transfer catalyst in the alkaline capture solution 126 has a weight concentration of 0.001-100% or in another range. In some instances, the alkaline capture solution can maintain a $CO_2$ capture rate equal to or greater than 75% of the $CO_2$ capture rate and/or quantity during the first cycle through 10-5000 cycles.

In some instances, the gaseous feed 122 that contacts the alkaline capture solution 126 has less than five percent carbon dioxide by weight, e.g., ambient air. In some instances, the gaseous feed 122 that contacts the alkaline capture solution 126 may be a flue gas. In some instances, the gaseous feed 122 includes a hybrid stream or an alternating stream of ambient air with 1-1000 ppm $CO_2$ concentration and flue gas with a $CO_2$ weight concentration in a range of 0.00001-100%. In some implementations, an intake pressure of the gaseous feed 122 at the inlet 123 of the gas-liquid contactor 112 has an absolute pressure (e.g., an intake absolute pressure) equal to or less than 110, 80, 50, 10, 1 PSI, or another pressure range. In some implementations, the intake absolute pressure is a pressure value of the gaseous feed 122 at the inlet 123 relative to vacuum.

In some implementations, the stripping column 142 of the second reactor 104 is a multi-tray stripping column to produce pure $CO_2$ gas during desorption and regenerate the alkaline capture solution. The heat applied by the heating unit 144 which may be operated based on steam generated utilizing solar heating system, electric or hybrid reboiler, waste heat from industrial manufacturing, refineries, power plants, nuclear power plants, geothermal heat, or other forms of heat. In some instances, the stripping column 142 may include industrial moisture recovery systems to prevent any water loss. The heating unit 144 is configured to heat the $CO_2$-rich alkaline capture solution 132 in the stripping column 142 to a temperature less than 200 degrees Celsius, e.g., in a range of 90-150° C., to reversibly release the $CO_2$ gas from the $CO_2$-rich alkaline capture solution 132 with a conversion efficiency in a range of 30-100% and a selectivity in a range of 93-100%. In some instances, the heating unit 144 may include a solar heating system, a gas-powered, fully electric or hybrid steam reboiler, or other heating system. In some instances, waste heat from any industry or any manufacturing or processing units including geothermal, battery metals mining and purifications, metal smelting processes, cement plants, glass manufacturing, biochar production, power plants, nuclear plants, fertilizer industries, chemical manufacturing, and oil refineries, may be used to power the heating unit 144 for the desorption process in the stripping column 142. The regenerated alkaline capture solution (e.g., a lean solution with a baseline or a negligible level of $CO_2$ concentration) is stored in the second reservoir 146, which may be fed back to the first reservoir 116 and used for the absorption reaction in the gas-liquid contactor 112.

In some implementations, the gaseous output 150 of the stripping column 142 includes $CO_2$ gas having a purity in a range of 91-100% or another range. The $CO_2$ gas obtained during the desorption process may be compressed and used as a low global warming refrigerant, in green houses for enhanced productivity, welding, feedstock for urea and to other useful chemicals and/or liquid fuels, to provide low global warming heating or cooling, used as feedstock for urea other useful chemicals, fuels, concrete/cement, as a blowing agent, carbonated beverages, or sequestered underground in geological formations or offshore or onshore depleted oil fields where the $CO_2$ gas can be stored (e.g., sequestration), or in other applications.

In some implementations, the gas-liquid contactor 112 based on the interfacial surface structure 114 can provide a carbon capture efficiency of 5-99% in a temperature range of −30° C. to 100° C. over a period of time. Here, the capture efficiency describes the proportion of $CO_2$ molecules captured in the absorption unit, compared to the total flux of $CO_2$ molecules through the system within a given time period (e.g., mass of $CO_2$ captured in one hour divided by mass of $CO_2$ through system in one hour). In some implementations, the absorption reaction in the gas-liquid contactor 112 and the desorption reaction in the stripping column 142 are reversible reactions. In some implementations, the methods and techniques presented here in the disclosure are highly scalable and consumes less processing volume of alkaline capture solution and less energy is required in comparison with conventional carbon removal techniques.

In some implementations, the control system 106 is communicably coupled to one or more control units of the example carbon processing system 100 (e.g., the pump 118, the monitoring device 120, the air mover 128, the heating unit 144, and other devices) to adjust the flow rate of the alkaline capture solution 126 through the gas-liquid contactor 112, the flow rate of the gaseous feed 122 through the interfacial surface structure 114, the temperature of the desorption process; and other processes. In some instances, the control system 106 may be coupled to other components of the example carbon processing system 100 to control other parameters. For example, the control system 106 may be coupled to a gas chromatograph configured to analyze the carbon dioxide concentration collected from the first reservoir 116 and the second reservoir 146, a pH sensor configured to measure the pH values of the alkaline capture solution 126, and other components or devices of the example carbon processing system 100. In some implementations, the control system 106 includes computation apparatus, a memory unit, an input/output interface, or other components that allow the communication of the control system 106 with other components of the example carbon processing system 100, determine control parameter values of the components of the example carbon processing system 100, and optimize the carbon removal performance of the example carbon processing system 100. In some instances, the control system 106 may be configured for performing other functions. In some instances, the control system 106 may include a fully automated sensing stack with visual centralized readouts.

Figure 2:
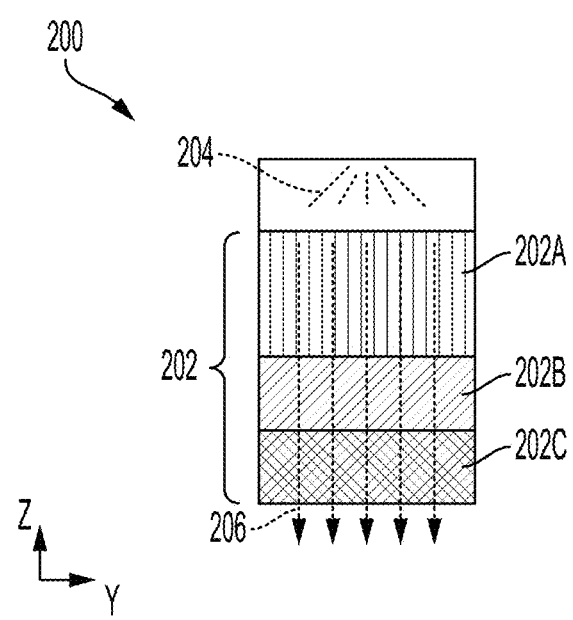
FIG. 2 is a schematic diagram showing aspects of an example gas-liquid contactor.

FIG. 2 is a schematic diagram showing aspects of an example gas-liquid contactor 200. The example gas-liquid contactor 200 may be implemented as the gas-liquid contactor 112 in the carbon processing system 100 in FIG. 1 or in another manner. As shown in FIG. 2, the gas-liquid contactor 200 includes an interfacial surface structure 202, and a liquid distributor 204. The gas-liquid contactor 200 may include additional or different features, and the components of the gas-liquid contactor 200 may operate as described with respect to FIG. 2 or in another manner.

As shown in FIG. 2, the example interfacial surface structure 202 is spatially divided into three sections 202A, 202B, 202C and arranged in tandem (one after the other) along the downward flow direction of the alkaline capture solution 206, e.g., the Z direction. The alkaline capture solution is received by the interfacial surface structure 202 from the liquid distribution 204. Each section 202A, 202B, 202C includes a set of contactor sheets. The set of contactor sheets in a section of the interfacial surface structure 202A, 202B, 202C may be distinct from the set of contactor sheets in a different section of the interfacial surface structure 202A, 202B, 202C. For example, different sections 202A, 202B, 202C may have contactor sheets with different specific surface areas; may have the same collector sheets but different spacings; may have the same contactor sheets but different surface treatment (e.g., different hydrophobicity); or may include contactor sheets arranged in another manner. In some instances, the contactor sheets in the same section may have profiles distinct from one another.

FIGS. 3A-3C are schematic diagrams showing aspects of example gas-liquid contactors 300, 320, 330. The example gas-liquid contactors 300, 320, 330 may be implemented as the gas-liquid contactor 112 in the carbon processing system 100 in FIG. 1 or in another manner. As shown in FIGS. 3A-3C, each of the gas-liquid contactors 300, 320, 330 includes an interfacial surface structure 302, one or more liquid distributors 304 configured to deliver an alkaline capture solution to surfaces of the interfacial surface structure, and one or more air movers 308 (A, B, and C respectively) configured to pull or push a gaseous feed 310 across the interfacial surface structure 302. The gas-liquid contactors 300, 320, 330 may include additional or different features, and the components of the gas-liquid contactors 300, 320, 330 may operate as described with respect to FIG. 3A-3C or in another manner.

As shown in FIGS. 3A-3C, the one or more liquid distributors 304 reside over the interfacial surface structure 302. The delivered alkaline capture solution is driven by gravity downwardly along the Z direction across the surfaces of the interfacial surface structure 302. The gas flow and the liquid flow may be in a crossflow fashion (FIG. 3A), where the gas flow formed by using a horizontal air mover 308A is along the Y direction, in a counter flow fashion (FIG. 3B) where the gas flow formed by using a vertical air mover 308B is upwardly along the Z direction opposite to the liquid flow direction, or a hybrid flow fashion (FIG. 3C) where the gas flow formed by using a horizontal air mover 308A and a vertical air mover 308B is along the Y and Z directions. The gas flow and liquid flow created across the surfaces of the interfacial surface structure 302 can provide efficient mass transfer. Gaseous exhaust 312 has a lower concentration of $CO_2$ gas than that of the gaseous feed 310; and the $CO_2$ gas in the gaseous feed 310 is dissolved in the alkaline capture solution forming a $CO_2$-rich alkaline capture solution 306.

Figure 4:
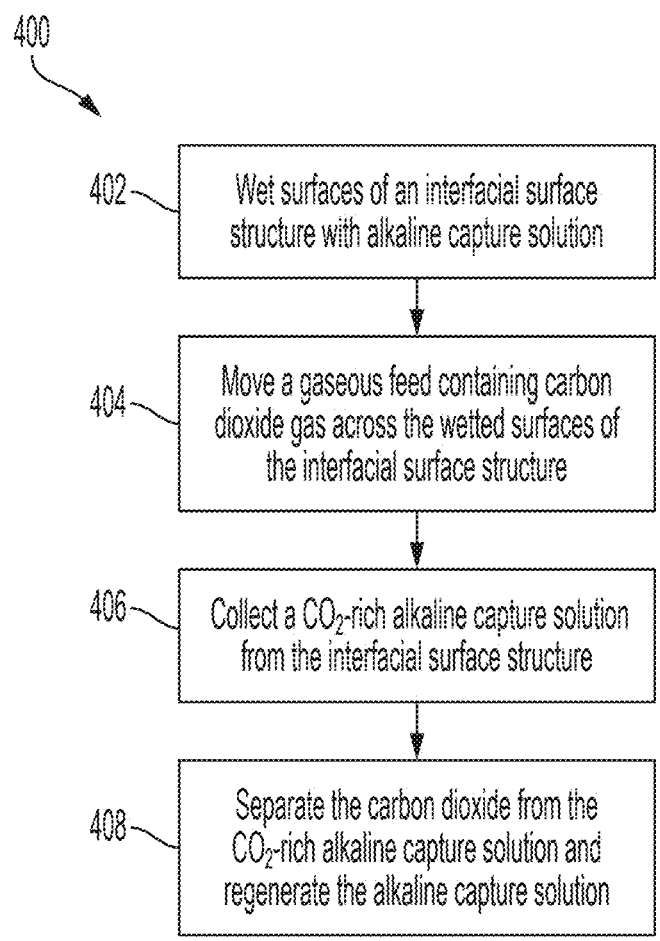
FIG. 4 is a flow chart showing an example process for removing carbon dioxide gas from a gaseous feed.

FIG. 4 is a flow chart showing aspects of an example process for removing $CO_2$ gas from a gaseous feed. The example process 400 can be used, for example, to operate a carbon processing system, e.g., the example carbon processing system 100 in FIG. 1. For instance, the example process 400 can be used to perform carbon dioxide removal directly from ambient air using a gas-liquid contactor filled with high surface area interfacial surface structure. The interfacial surface structure of the gas-liquid contactor may be implemented as the interfacial surface structure 114, 202, 302, 500, 600, 700, 800, 900, 1000, 1100, 1200, 1300, 1900 as shown in FIGS. 1-2, 3A-3C, 5-13, and 19A-19B, or in another manner, with a liquid retention time in a range of 10-500 s/m along the vertical direction (e.g., Z-direction) and a specific liquid mass retention at sixty seconds ($SLMR_{t=60s}$) in a range of 10-300 $kg/m^3$. The example process 400 may include additional or different operations, including operations performed by additional or different components, and the operations may be performed in the order shown or in another order. In some implementations, one or more operations in the example process 400 can be performed by a computer system, for instance, by a digital computer system having one or more digital processors (e.g., data processing apparatus of the control system 106 in FIG. 1) that execute instructions (e.g., instructions stored in the memory unit of the control system 106).

At 402, surfaces of the interfacial surface structure in the gas-liquid contactor are wet using an alkaline capture solution. The alkaline capture solution (e.g., the alkaline capture solution 126 in FIG. 1) can be pumped by a pump (e.g., the pump 118 in FIG. 1) and distributed by one or more liquid distributor (e.g., the liquid distributor 130, 204, 304, 1802 in FIGS. 1-2, 3A-3C and 18) residing above the interfacial surface structure in the gas-liquid contactor. The alkaline capture solution descends along the surfaces of the interfacial surface structure forming wet surfaces, e.g., driven by gravity.

At 404, the gaseous feed containing $CO_2$ gas is moved across the wetted surfaces of the interfacial surface structure. The gaseous feed cross flows across the wetted surfaces of the interfacial surface structure in a crossflow fashion (as shown in FIG. 3A), in a counter flow fashion (as shown in FIG. 3B), or a hybrid flow fashion (as shown in FIG. 3C).

At 406, the $CO_2$-rich alkaline capture solution is collected after contact with the interfacial surface structure. The $CO_2$ gas in the gaseous feed when moving across the wetted surfaces of the interfacial surface structure dissolves into the alkaline capture solution on the surfaces of the interfacial surface structure and forms a $CO_2$-rich alkaline capture solution. In some implementations, a gaseous exhaust, e.g., the gaseous exhaust 312 as shown in FIGS. 3A-3C, can be generated by passing the gaseous feed through the wetted surfaces of the interfacial surface structure; and mist in the gaseous exhaust can be aggregated into liquid droplets in a demister separator, which can be returned back to the interfacial surface structure or the reservoir (e.g., as shown in FIGS. 3A-3C). In some instances, the mist in the gaseous exhaust may include small liquid droplets of the alkaline capture solution sprayed from the liquid distributor and suspended/carried by gaseous exhaust.

At 408, the dissolved $CO_2$ gas is separated from the $CO_2$-rich alkaline capture solution and the alkaline capture solution can be regenerated. In response to the $CO_2$ concentration in the $CO_2$-rich alkaline capture solution reaching a threshold (e.g., when the alkaline capture solution is saturated with the dissolved $CO_2$ gas), the $CO_2$-rich alkaline capture solution is filtered and pumped via pipes into a stripping column (e.g., the stripping column 142 in FIG. 1). The $CO_2$-rich alkaline capture solution is then heated to a temperature sufficient to desorb the dissolved $CO_2$ gas and the liquid condensates. In some instances, the stripping column may include multiple trays or may operate as a packed bed to provide an easy vapor-liquid equilibrium and hence separation of the dissolved $CO_2$ gas from vapor/liquid condensate. After passing through the stripping column and a drying column for removing moisture, a $CO_2$ gas with a purity of 91-100% is collected. This $CO_2$ gas can then be compressed for sequestration or utilization in other applications.

Figure 5:
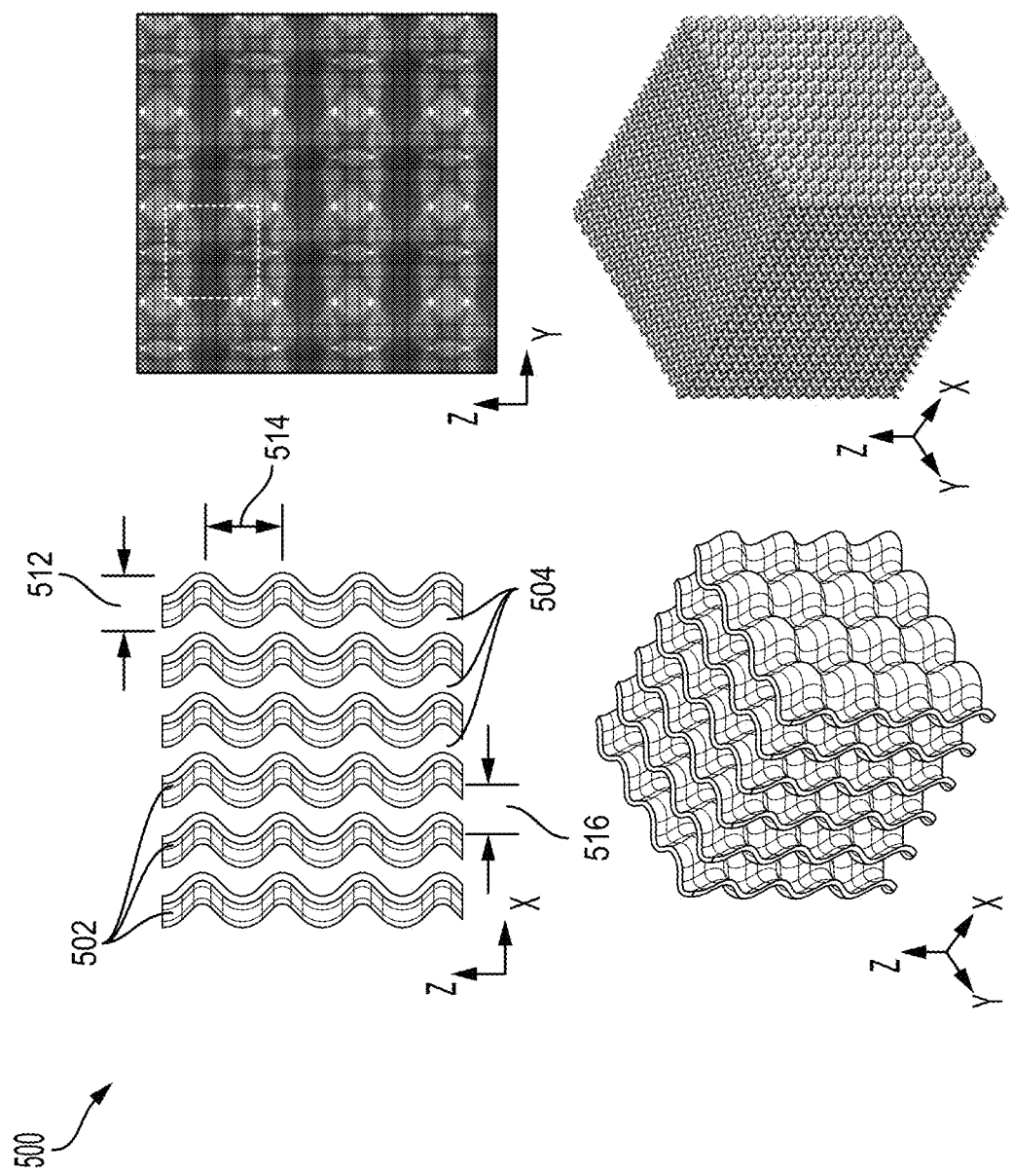
FIG. 5 is a diagram showing an example configuration of contactor sheets having an egg crate profile.

FIG. 5 includes schematic diagrams showing aspects of an example interfacial surface structure 500. The example interfacial surface structure 500 includes a reticulate structure defined by multiple contactor sheets 502. Neighboring contactor sheets 502 are assembled in a face-to-face and in-phase fashion separated by a uniform spacing 504. As shown in FIG. 5, each contactor sheet 502 is a continuous solid; and is defined by a periodic surface structure with an egg crate profile oscillating along both Z and Y directions. The periodic surface structure of the contactor sheet 502 varies smoothly along the two spatial coordinates (e.g., Y and Z axis). As shown in FIG. 5, the contactor sheet 502 includes rounded edges which can reduce pressure drop, increase surface area, prevent over-concentration of chemistry in ridged channels, promote greater randomness and spread in wetting, and provide other potential advantages. The peak-to-peak amplitude 512, the pitch size 514 of the periodic surface structure of each contactor sheet 502, and the thickness 516 of the spacing 504 between neighboring contactor sheets 502 are greater than the thickness of the contactor sheet 502.

The contactor sheets 502 in the interfacial surface structure 500 are parallel to one another, allowing for a denser packing of the contactor sheets 502 without significant pressure drop or interference. The spacing 504 between two neighboring contactor sheets 502 defines a channel where gas and liquid phases flow and contact each other. As shown in FIG. 5, the periodic surface structure of the contactor sheet 502 has a square lattice. In certain instances, the periodic surface structure of the contactor sheet 502 may have a triangular lattice, a hexagonal lattice, a rectangular lattice, or another type of lattice. In some instances, the example interfacial surface structure 500 may be implemented as the interfacial surface structure 114, 202, 302 in FIGS. 1-2 and 3A-3C or in another manner; and may be operated to perform operations in the example process 400 FIG. 4 to remove $CO_2$ gas in a gaseous feed or in another manner.

In some implementations, the interfacial surface structure 500, when being configured in a gas-liquid contactor, are arranged such that the gaseous feed flow along the Z or Y direction in the channels defined by the spacing 504 between neighboring contactor sheets 502, and the alkaline capture solution flows downwardly along the Z direction on the surfaces of the contactor sheets 502.

Figure 6:
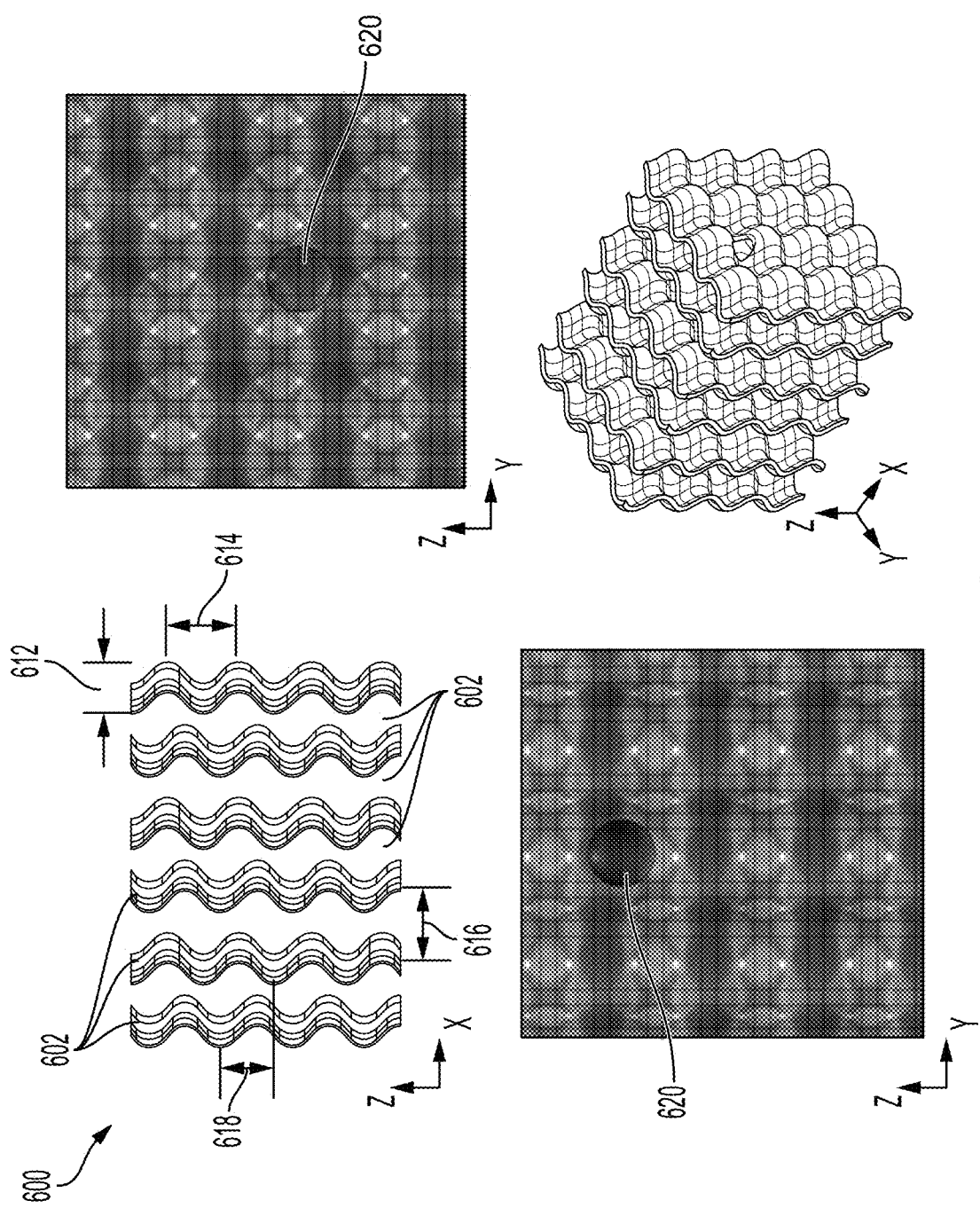
FIG. 6 is a diagram showing another example configuration of contactor sheets having an egg crate profile.

FIG. 6 includes schematic diagrams showing aspects of an example interfacial surface structure 600. The example interfacial surface structure 600 includes a reticulate structure defined by multiple contactor sheets 602. As shown in FIG. 6, each contactor sheet 602 is a continuous solid; and is defined by a periodic surface structure with an egg crate profile oscillating along both Z and Y directions. The periodic surface structure of the contactor sheet 602 varies smoothly along the two spatial coordinates (e.g., Y and Z axis). As shown in FIG. 6, the contactor sheet 602 includes rounded edges which can reduce pressure drop, increase surface area, prevent over-concentration of chemistry in ridged channels, promote greater randomness and spread in wetting, and other potential advantages. As shown in FIG. 6, each contactor sheet 602 includes one or more through holes 620 and through holes in the neighboring contactor sheets 602 are out of phase, e.g., through holes on one contactor sheet 602 are misaligned with through holes on neighboring contactor sheets 602. In some implementations, the misaligned through holes 620 are configured to redirect airflow for more favorable dissolution of $CO_2$ into the alkaline solution. The peak-to-peak amplitude 612, the pitch size 614 of the periodic surface structure of each contactor sheet 602, the phase shift 618 between neighboring contactor sheets 602, and the thickness 616 of the spacing 604 between neighboring contactor sheets 602 are greater than the thickness of the contactor sheet 602.

Neighboring contactor sheets 602 are assembled in a face-to-face and out-of-phase fashion separated by a non-uniform spacing 604, allowing for an improvement in turbulence and randomness of wetting. The spacing 604 between two neighboring contactor sheets 602 defines a channel where gas and liquid phases flow and contact each other. As shown in FIG. 6, the periodic surface structure of the contactor sheet 602 has a square lattice. In certain instances, the periodic surface structure of the contactor sheet 602 may have a triangular lattice, a hexagonal lattice, or another type of lattice. In some instances, the example interfacial surface structure 500 may be implemented as the interfacial surface structure 114, 202, 302 in FIGS. 1 and 3A-3C or in another manner; and may be operated to perform operations in the example process 400 FIG. 4 to remove $CO_2$ gas in a gaseous feed or in another manner.

In some implementations, the interfacial surface structure 600, when being configured in a gas-liquid contactor, are arranged such that the gaseous feed flow along the Z or Y direction in the channels defined by the spacing 604 between neighboring contactor sheets 602, and the alkaline capture solution flows downwardly along the Z direction on the surfaces of the contactor sheets 602.

Figure 7:
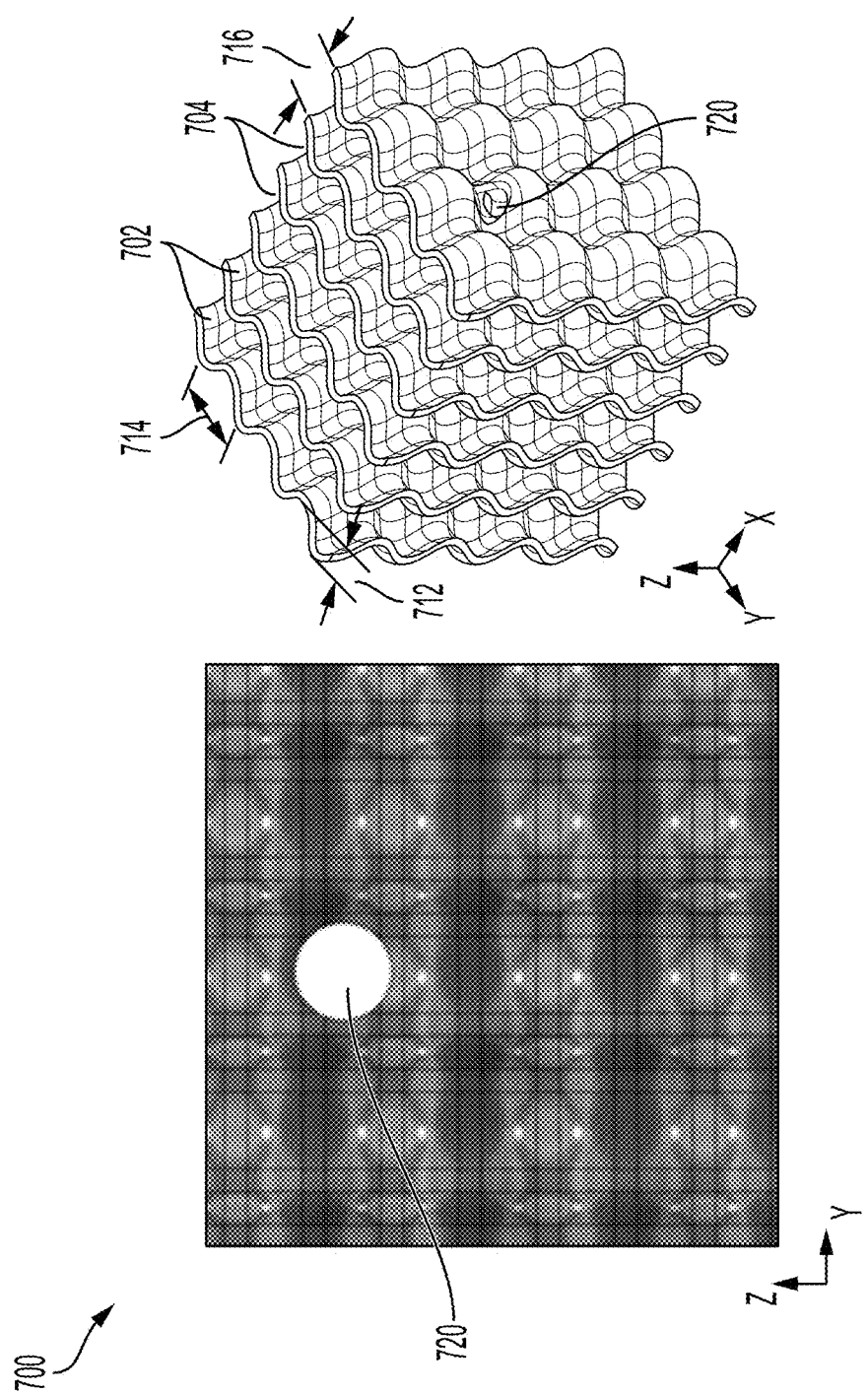
FIG. 7 is a diagram showing another example of contactor sheets having an egg crate profile.

FIG. 7 includes schematic diagrams showing aspects of an example interfacial surface structure 700. The example interfacial surface structure 700 includes a reticulate structure defined by multiple contactor sheets 702. Neighboring contactor sheets 702 are assembled in a face-to-face and in-phase fashion separated by a uniform spacing 704. As shown in FIG. 7, each contactor sheet 702 is a continuous solid; and is defined by a periodic surface structure with an egg crate profile oscillating along both Z and Y directions. The periodic surface structure of the contactor sheet 702 varies smoothly along the two spatial coordinates (e.g., Y and Z axis). As shown in FIG. 7, the contactor sheet 702 includes rounded edges which can lower pressure drop, increase surface area, prevent over-concentration of chemistry in ridged channels, promote greater randomness and spread in wetting, and other potential advantages. As shown in FIG. 7, each contactor sheet 702 includes one or more through holes 720 and through holes in the neighboring contactor sheets 702 are in phase, e.g., the through holes 720 on one contactor sheet 702 are aligned with through holes 720 on neighboring contactor sheets 602. In some instances, the aligned through holes 720 in the interfacial surface structure 700 can affect the aerodynamics through the structure encourage more random flow of both air and chemistry, increasing turbulence and mixing. The peak-to-peak amplitude 712, the pitch size 714 of the periodic surface structure of each contactor sheet 702, and the thickness 716 of the spacing 704 between neighboring contactor sheets 702 are greater than the thickness of the contactor sheet 702. In some instances, the contactor sheets 702 may be implemented as the contactor sheets 502, 602 in FIGS. 5, 6 or in another manner.

The contactor sheets 702 in the interfacial surface structure 700 are parallel to one another, allowing for a denser packing of the contactor sheets 702 without significant pressure drop or interference. The spacing 704 between two neighboring contactor sheets 702 defines a channel where gas and liquid phases flow and contact each other. As shown in FIG. 7, the periodic surface structure of the contactor sheet 702 has a square lattice. In certain instances, the periodic surface structure of the contactor sheet 702 may have a triangular lattice, a hexagonal lattice, or another type of lattice. In some instances, the example interfacial surface structure 700 may be implemented as the interfacial surface structure 114, 202, 302 in FIGS. 1 and 3A-3C or in another manner; and may be operated to perform operations in the example process 400 FIG. 4 to remove $CO_2$ gas in a gaseous feed or in another manner.

In some implementations, the interfacial surface structure 700, when being configured in a gas-liquid contactor, are arranged such that the gaseous feed flow along the Z or Y direction in the channels defined by the spacing 704 between neighboring contactor sheets 702, and the alkaline capture solution flows downwardly along the Z direction on the surfaces of the contactor sheets 702.

Figure 8:
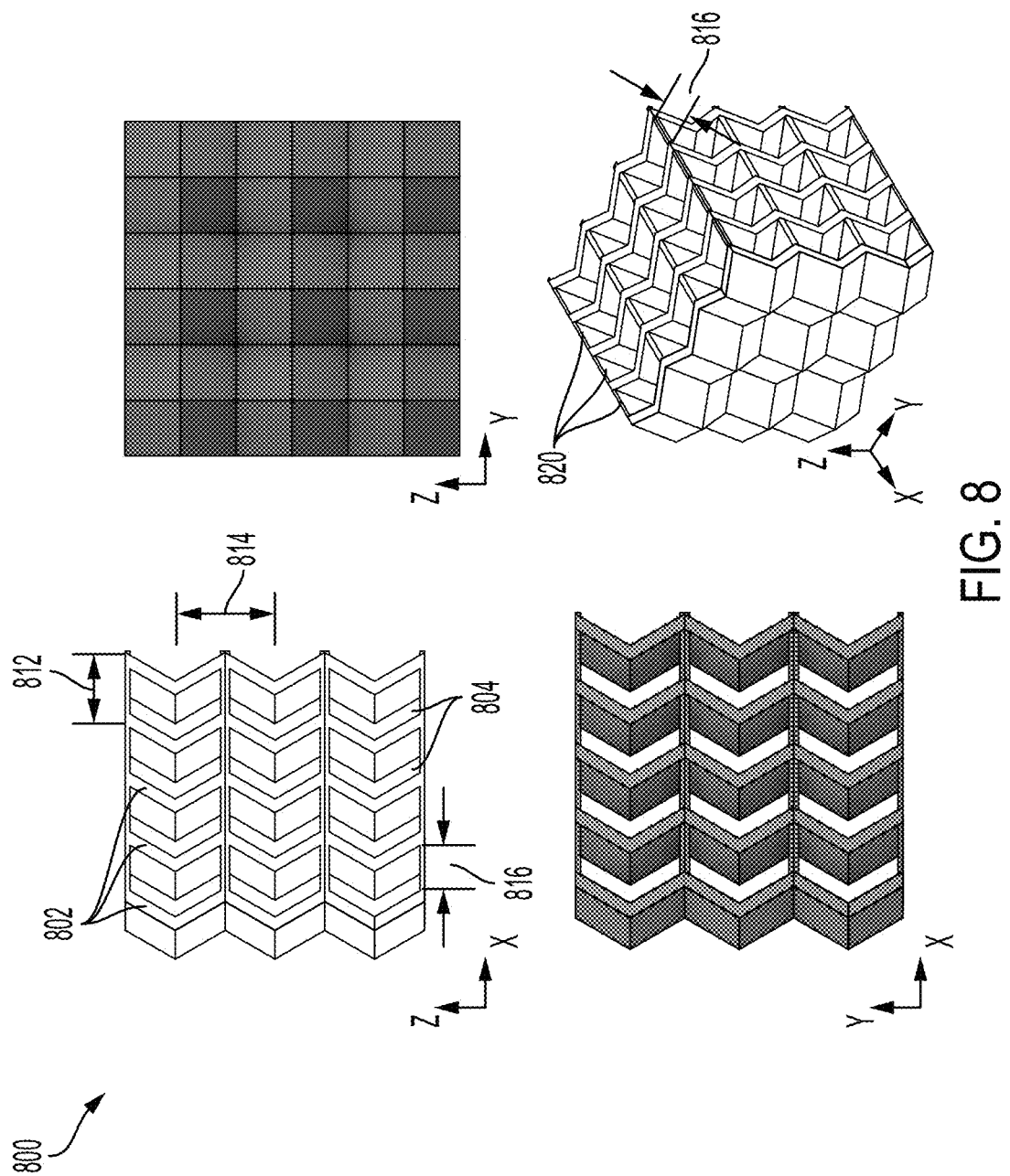
FIG. 8 is a diagram showing an example interfacial surface structure having a jagged wedge profile.

FIG. 8 includes schematic diagrams showing aspects of an example interfacial surface structure 800. The example interfacial surface structure 800 includes a reticulate structure defined by multiple contactor sheets 802. Neighboring contactor sheets 802 are assembled in a face-to-face and in-phase fashion separated by a uniform spacing 804. The contactor sheets 802 are mounted to neighboring ones using connecting frames 820. As shown in FIG. 8, each contactor sheet 802 is a continuous solid; and is defined by a periodic surface structure with a jagged wedge profile oscillating along both Z and Y directions. As shown in FIG. 8, the contactor sheet 802 includes sharp edges which can increase turbulence; enforce better liquid-air contact and mixing; and provide other potential advantages. The peak-to-peak amplitude 812, the pitch size 814 of the periodic surface structure of each contactor sheet 802, and the thickness 816 of the spacing 804 between neighboring contactor sheets 802 are greater than the thickness of the contactor sheet 802.

The contactor sheets 802 in the interfacial surface structure 800 are parallel to one another, allowing for a denser packing of the contactor sheets 802 without significant pressure drop or interference. The spacing 804 between two neighboring contactor sheets 802 defines a channel where gas and liquid phases flow and contact each other. As shown in FIG. 8, the periodic surface structure of the contactor sheet 802 has a square lattice. In certain instances, the periodic surface structure of the contactor sheet 802 may have a triangular lattice, a hexagonal lattice, or another type of lattice. In some instances, the example interfacial surface structure 800 may be implemented as the interfacial surface structure 114, 202, 302 in FIGS. 1 and 3A-3C or in another manner; and may be operated to perform operations in the example process 400 FIG. 4 to remove $CO_2$ gas in a gaseous feed or in another manner.

In some implementations, the interfacial surface structure 800, when being configured in a gas-liquid contactor, are arranged such that the gaseous feed flow along the Z or Y direction in the channels defined by the spacing 804 between neighboring contactor sheets 802, and the alkaline capture solution flows downwardly along the Z direction on the surfaces of the contactor sheets 802.

Figure 9:
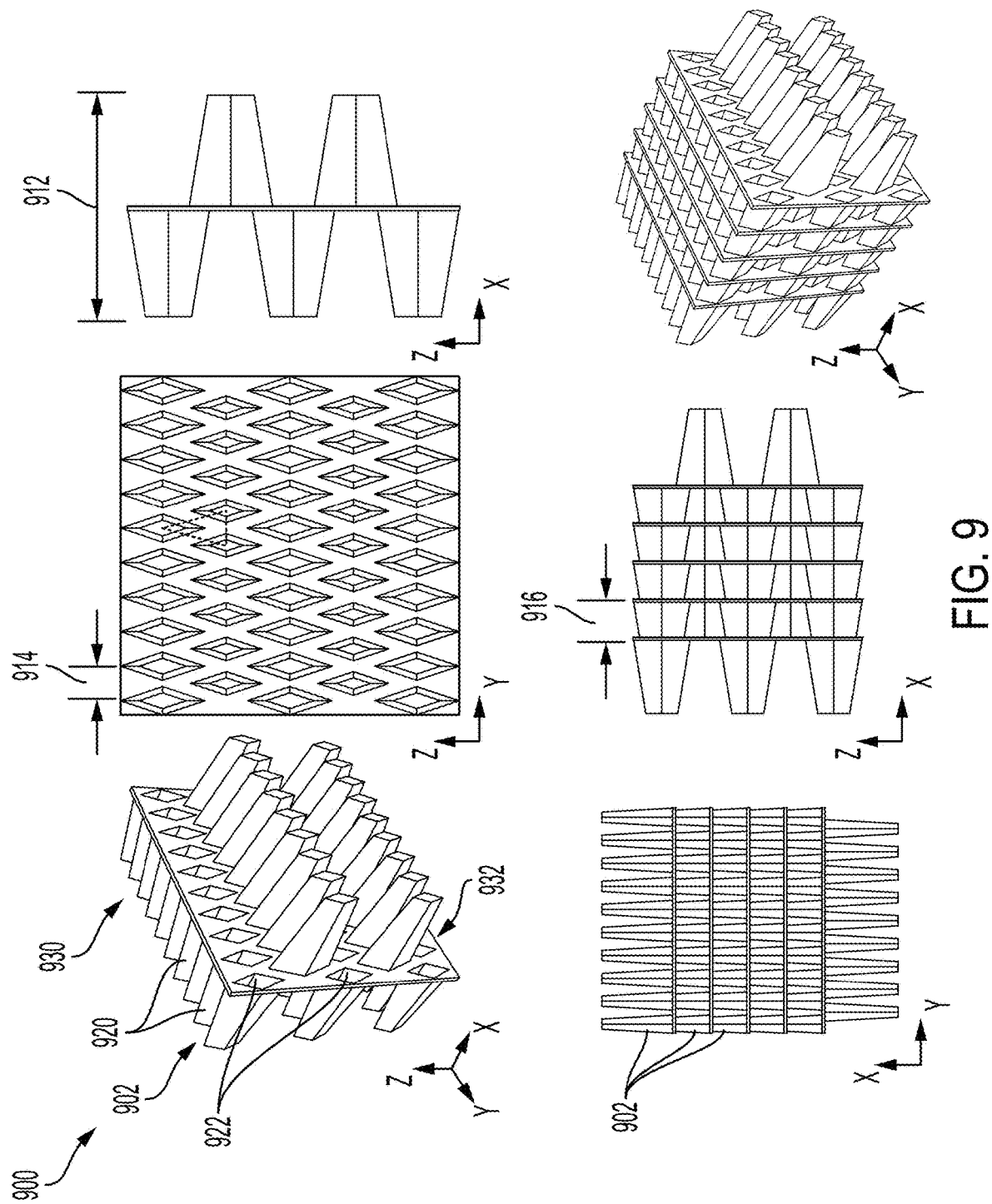
FIG. 9 is a diagram showing example contactor sheets having interlocking fins.

FIG. 9 includes schematic diagrams showing aspects of an example interfacial surface structure 900. The example interfacial surface structure 900 includes a reticulate structure defined by multiple contactor sheets 902. Neighboring contactor sheets 902 are assembled in a face-to-face and in-phase fashion separated by a uniform spacing 916. As shown in FIG. 9, each contactor sheet 902 is a continuous solid; and is defined by a periodic surface structure with a first array of interlocking fins 920 on a first surface 930 and a second array of interlocking fins 920 on a second, opposite surface 932. The interlocking fins 920 from neighboring contactor sheets 902 are staggered into one another to increase liquid-air exposure time by lengthening the liquid's path. The spacing 916 between neighboring contactor sheets 902 is defined by the taper on the respective interlocking fins 920, which limits the extent to which each staggering fin 920 can be inserted into a corresponding mating holes 922. After assembly, the interfacial surface structure 900 includes exposed portions of the interlocking fins 920 extending in a direction (e.g., X direction) orthogonal to the downwardly flow of the alkaline solution (e.g., along the Z direction) and the flow of the gaseous feed (e.g., along the Y and/or Z direction). The interfacial surface structure 900 with interlocking fins 920 reduces direct paths for the alkaline capture solution to exit the interfacial surface structure 900; and increase the residence time of the alkaline capture solution on the surfaces of the interfacial surface structure 900.

As shown in FIG. 9, the interfacial surface structure 900 can lower pressure drop, increase surface area, prevent over-concentration of chemistry in ridged channels, promote greater randomness and spread in wetting, and other potential advantages. The peak-to-peak amplitude 912, the pitch size 914 of the periodic surface structure of each contactor sheet 902, and the spacing 916 between neighboring contactor sheets 902 are greater than the thickness of the contactor sheet 902.

The contactor sheets 902 in the interfacial surface structure 900 are parallel to one another, allowing for a denser packing of the contactor sheets 902 without significant pressure drop or interference. The exposed portion of the interlocking fins 920 in the interfacial surface structure 900 define channels where gas and liquid phases flow and contact each other. As shown in FIG. 9, the periodic surface structure of the contactor sheet 902 has a triangular lattice. In certain instances, the periodic surface structure of the contactor sheet 902 may have a square lattice, a hexagonal lattice, or other types of lattices. In some instances, the example interfacial surface structure 900 may be implemented as the interfacial surface structure 114, 202, 302 in FIGS. 1 and 3A-3C or in another manner; and may be operated to perform operations in the example process 400 FIG. 4 to remove $CO_2$ gas in a gaseous feed or in another manner.

Figure 10:
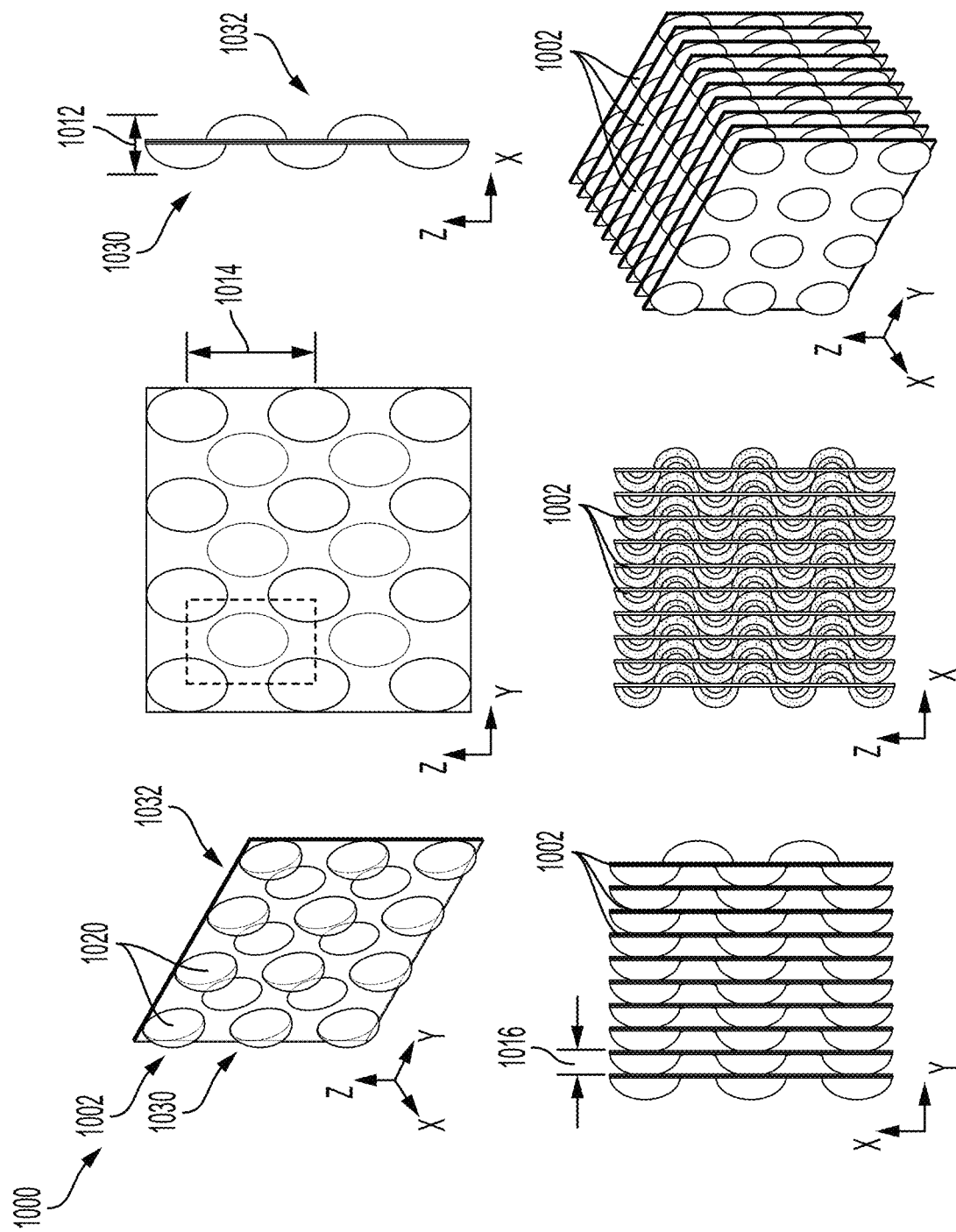
FIG. 10 is a diagram showing example contactor sheets having a staggered hemi-ovoid profile.

FIG. 10 includes schematic diagrams showing aspects of an example interfacial surface structure 1000. The example interfacial surface structure 1000 includes a reticulate structure defined by multiple contactor sheets 1002. Neighboring contactor sheets 1002 are assembled in a face-to-face and in-phase fashion separated by a uniform spacing 1016. As shown in FIG. 10, each contactor sheet 1002 is a continuous solid; and is defined by a periodic surface structure having a staggered hemi-ovoid profile. In particular, the contactor sheet 1002 includes a first array of hemi-ovoid features 1020 on a first surface 1030 and a second array of hemi-ovoid features 1020 on a second, opposite surface 1032. The first and second arrays of hemi-ovoid features 1020 on the first and second surfaces of a contactor sheet 1002 are complementary and designed to align against the respective arrays on the neighboring contactor sheets 1002.

The hemi-ovoid features 1020 of neighboring contactor sheets 902 are staggered to one another to increase liquid-air exposure time by lengthening the liquid's path. The spacing 1016 between neighboring contactor sheets 1002 is defined by the height of the hemi-ovoid feature. The curved surfaces of the hemi-ovoid features 1020 on the surfaces of the contactor sheets 1002 reduce drag, which lowers pressure drop across the unit. After assembly, the interfacial surface structure 1000 includes the surfaces of the hemi-ovoid features 1020 extending in a direction (e.g., X direction) orthogonal to the downwardly flow direction of the alkaline solution (e.g., along the Z direction) and the flow direction of the gaseous feed (e.g., along the Y and/or Z direction). The interfacial surface structure 1000 with hemi-ovoid features 1020 reduces direct paths for the alkaline capture solution to exit the interfacial surface structure 1000; and increase the residence time of the alkaline capture solution on the surfaces of the interfacial surface structure 1000.

As shown in FIG. 10, the interfacial surface structure 1000 can lower pressure drop, increase surface area, prevent over-concentration of chemistry in ridged channels, promote greater randomness and spread in wetting, and other potential advantages. The peak-to-peak amplitude 1012, the pitch size 1014 of the periodic surface structure of each contactor sheet 1002, and the spacing 1016 between neighboring contactor sheets 1002 are greater than the thickness of the contactor sheet 1002.

The contactor sheets 1002 in the interfacial surface structure 1000 are parallel to one another, allowing for a denser packing of the contactor sheets 1002 without significant pressure drop or interference. The surfaces of the hemi-ovoid features 1020 in the interfacial surface structure 1000 define channels where gas and liquid phases flow and contact each other. As shown in FIG. 10, the periodic surface structure of the contactor sheet 1002 has a rectangular lattice. In certain instances, the periodic surface structure of the contactor sheet 1002 may have a triangular lattice, a square lattice, a hexagonal lattice, or other types of lattices. In some instances, the example interfacial surface structure 1000 may be implemented as the interfacial surface structure 114, 202, 302 in FIGS. 1 and 3A-3C or in another manner; and may be operated to perform operations in the example process 400 FIG. 4 to remove $CO_2$ gas in a gaseous feed or in another manner.

Figure 11:
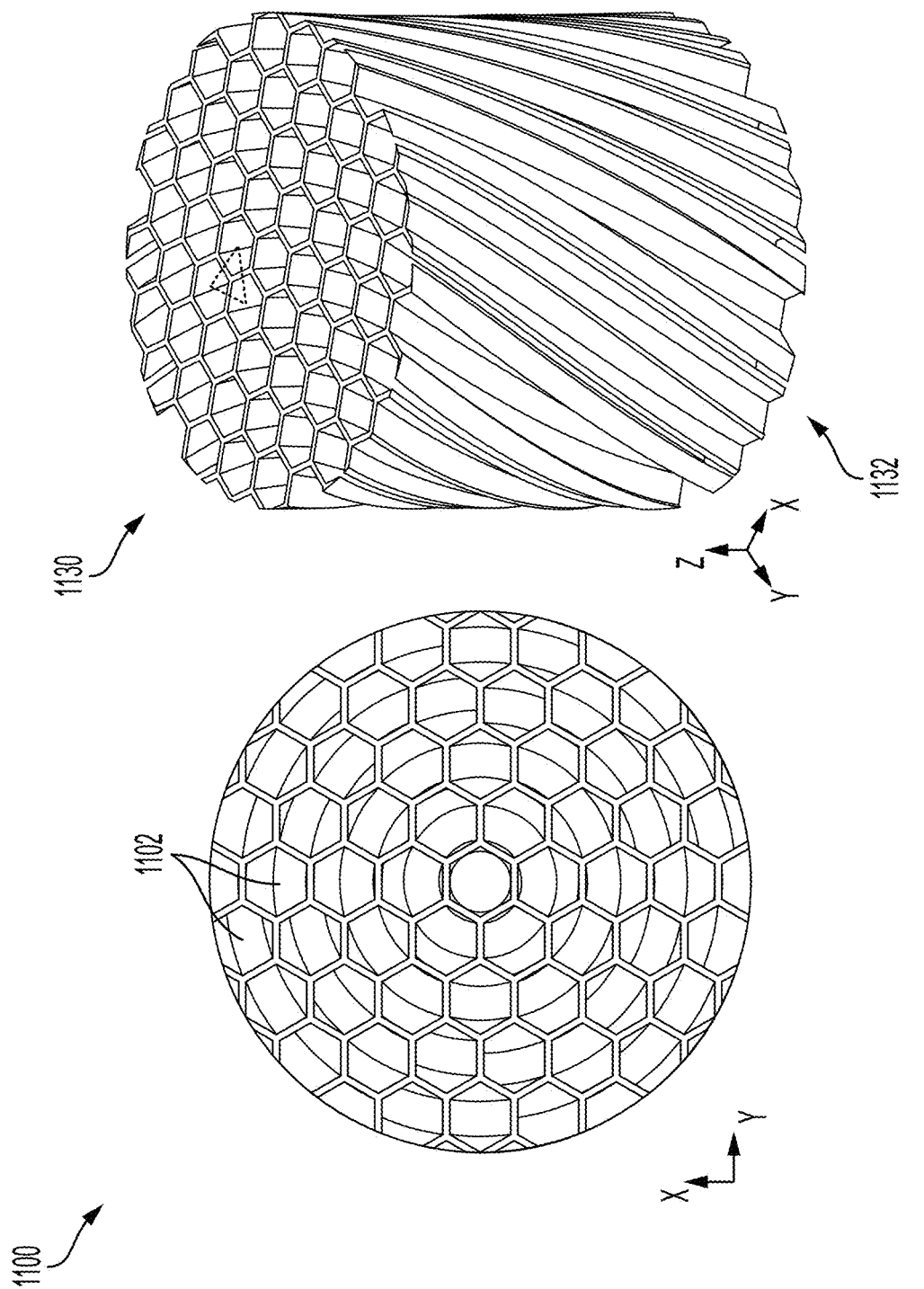
FIG. 11 is a diagram showing an example interfacial surface structure having an extruded twisting hexagonal structure.

FIG. 11 is a schematic diagram showing aspects of an example interfacial surface structure 1100. The example interfacial surface structure 1100 includes a reticulate structure defined by an extruded twisting hexagonal structure. The example interfacial surface structure 1100 includes multiple twisting channels 1102 along the Z direction extending from a first end 1130 to a second, opposite end 1132. The multiple twisting channels 1102 in the interfacial surface structure 1100 form a hexagonal tessellation, which rotates along the Z axis as the twisting channels move from the first end 1130 to the second opposite end 1132. In some implementations, the rotation of the hexagonal tessellation increases liquid-air exposure by lengthening the liquid path and residence time.

As shown in FIG. 11, the cross-section of each twisting channel 1102 has a roughly hexagonal shape. In certain instances, the shape of the cross-section of each twisting channel 1102 may be circular, rectangular, square, rectangular, or another shape. In some instances, the example interfacial surface structure 1100 may be implemented as the interfacial surface structure 114, 302 in FIGS. 1 and 3C or in another manner; and may be operated to perform operations in the example process 400 FIG. 4 to remove $CO_2$ gas in a gaseous feed or in another manner.

Figure 12:
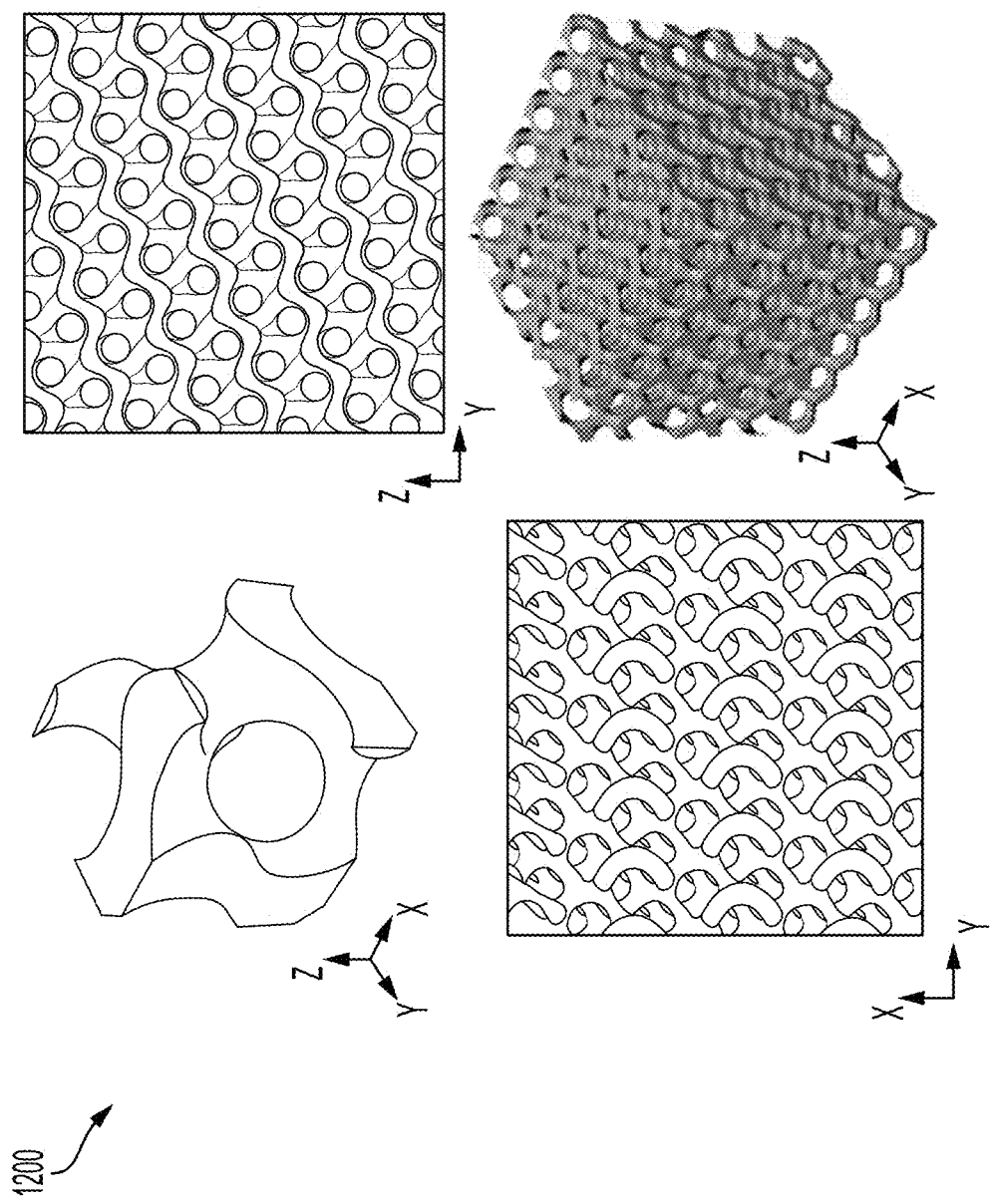
FIG. 12 is a diagram showing interfacial surface structure having a gyroid lattice structure.

FIG. 12 is a schematic diagram showing aspects of an example interfacial surface structure 1200. The example interfacial surface structure 1100 includes a reticulate structure defined by a gyroid lattice. In some instances, the gyroid lattice is angled, which is orthogonal to the flow direction of the gaseous feed. The gyroid lattice is angled to create direct paths for the gaseous feed through the interfacial surface structure 1200 minimizing pressure drop; provides no direct paths for the alkaline capture solution to exit, increasing liquid-air exposure.

Figure 13:
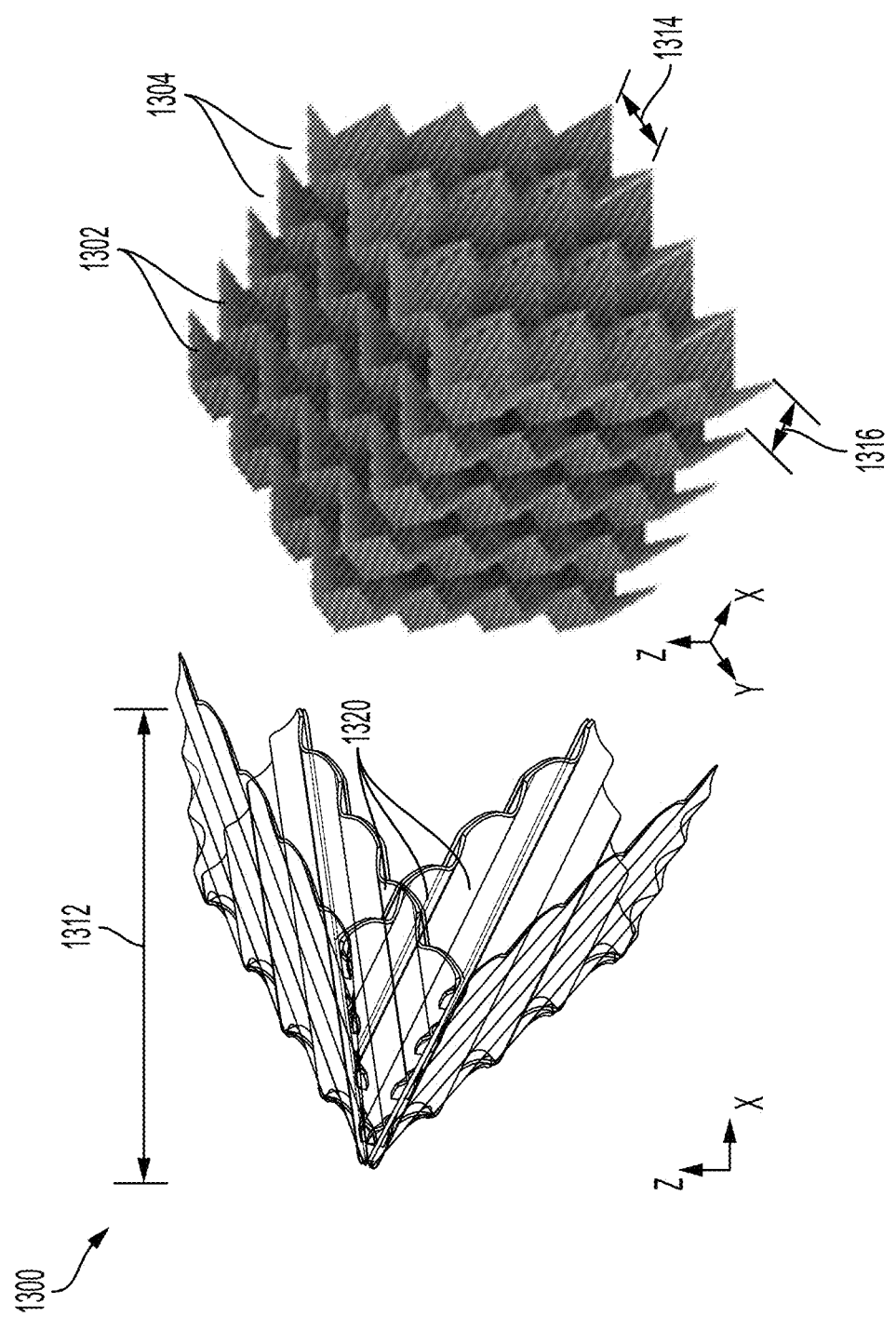
FIG. 13 is a diagram showing example contactor sheets having a pyramid profile.

FIG. 13 includes schematic diagrams showing aspects of an example interfacial surface structure 1300. The example interfacial surface structure 1300 includes a reticulate structure defined by multiple contactor sheets 1302. Neighboring contactor sheets 1302 are assembled in a face-to-face and in-phase fashion separated by a uniform spacing 1304. As shown in FIG. 13, each contactor sheet 1302 is a continuous solid; and is defined by a periodic surface structure with a pyramid profile oscillating along both Z and Y directions. As shown in FIG. 5, the contactor sheet 1302 includes sharp edges which can lower pressure drop, increase surface area, prevent over-concentration of chemistry in ridged channels, promote greater randomness and spread in wetting, and other potential advantages. The peak-to-peak amplitude 1312, the pitch size 1314 of the periodic surface structure of each contactor sheet 1302, and the thickness 1316 of the spacing 1304 between neighboring contactor sheets 1302 are greater than the thickness of the contactor sheet 1302. A shown in FIG. 13, surfaces of the contactor sheets 1302 includes fine ridged edges 1320, which further increase the surface area of the contactor sheet 1302. The contactor sheets 1302 can provide increased surface area and sheer number of ridged edges 1320 can retain more liquid droplets for more prolonged contact for liquid-gas exchange.

The contactor sheets 1302 in the interfacial surface structure 1300 are parallel to one another, allowing for a denser packing of the contactor sheets 1302 without significant pressure drop or interference. The spacing 1304 between two neighboring contactor sheets 1302 defines a channel where gas and liquid phases flow and contact each other. As shown in FIG. 13, the periodic surface structure of the contactor sheet 1302 has a square lattice. In certain instances, the periodic surface structure of the contactor sheet 1302 may have a triangular lattice, a hexagonal lattice, or another type of lattice. In some instances, the example interfacial surface structure 1300 may be implemented as the interfacial surface structure 114, 202, 302 in FIGS. 1 and 3A-3C or in another manner; and may be operated to perform operations in the example process 400 FIG. 4 to remove $CO_2$ gas in a gaseous feed or in another manner.

In some implementations, the interfacial surface structure 1300, when being configured in a gas-liquid contactor, are arranged such that the gaseous feed flow along the Z or Y direction in the channels defined by the spacing 1304 between neighboring contactor sheets 1302, and the alkaline capture solution flows downwardly along the Z direction on the surfaces of the contactor sheets 1302.

Figure 14:
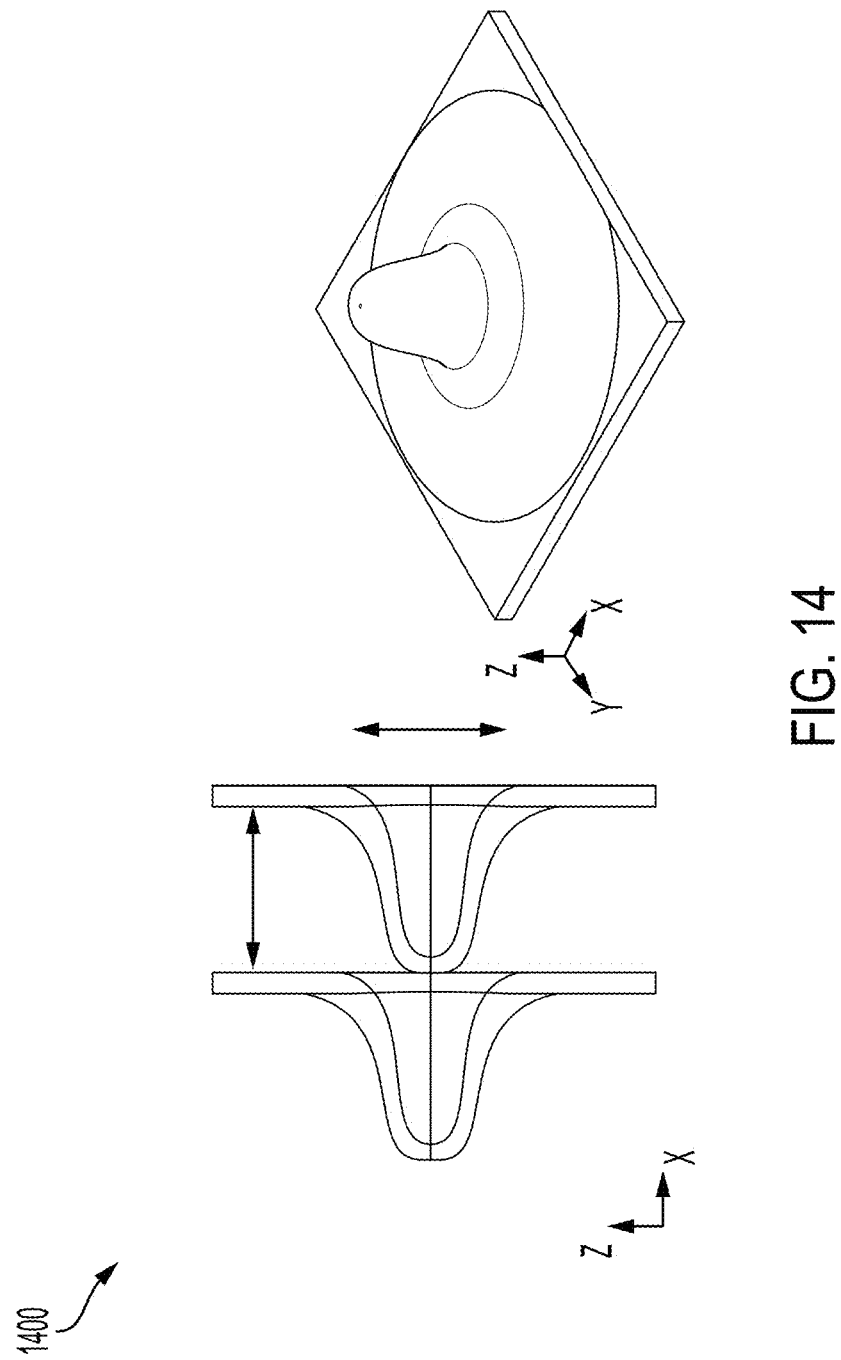
FIG. 14 is a diagram showing an example spacer.

FIG. 14 includes schematic diagrams showing aspects of an example spacer 1400. In some implementations, the example spacers 1400 may be used to define and maintain a desired spacing between contactor sheets in interfacial surface structure. For example, the spacers 1400 may be compressed between contactor sheets 502, 602, 702, 802, 902, 1002, 1302 in the example interfacial surface structures 500, 600, 700, 800, 900, 1000, 1300 as shown in FIGS. 5-10 and 13. In some instances, the spacers 1400 may include the same material as the contactor sheets and may be fabricated using the same method as the one used to fabricate the interfacial surface structure 114 in FIG. 1 or in another manner. In some implementations, the spacer 1400 between neighboring contactor sheets are configured to ensure a high homogeneity of the local pressure drop, less restricted flow paths, and a good distribution of the phases in the packing. In some instances, the spacer 1400 may have another shape or geometry different from the one shown in FIG. 14.

Figure 15:
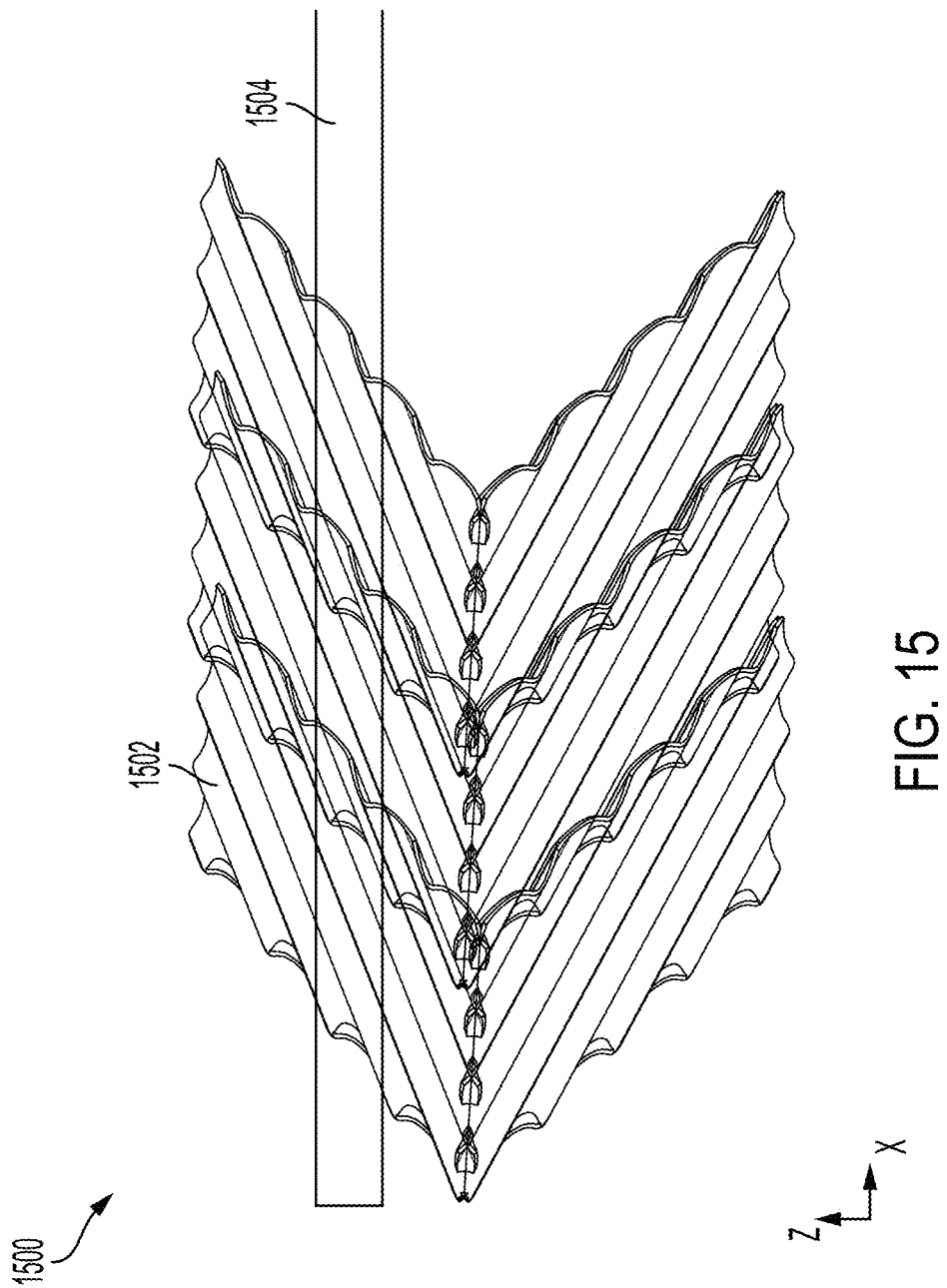
FIG. 15 is a schematic diagram showing aspects of example interfacial surface structure.

FIG. 15 is a schematic diagram showing aspects of an example interfacial surface structure 1500. The example interfacial surface structure 1500 includes a reticulate structure defined by multiple contactor sheets 1502. Neighboring contactor sheets 1502 are assembled in a face-to-face and in-phase fashion along an assembly rail 1504. Each contactor sheet 1502 includes an alignment hole configured to install the contactor sheet 1502 on the assembly rail 1504. In some instances, the interfacial surface structure 1500 includes multiple parallel assembly rails 1504 configured to secure each contactor sheet 1502 in two dimensions, leaving them free only to slide along the assembly rails 1504. In some instances, the contactor sheets 1502 can be pressed firmly together, relying on the compression of spacers (shown in FIG. 13) to hold each sheet in its desired location. The assembled contactor sheets 1502 are constrained from separating by the adjacent wall of the gas-liquid contactor it rests against, using mounting clips, or in another manner. In some instances, the assembly rails 1504 may include metal, ceramic, plastic, or another type of material.

Figure 16:
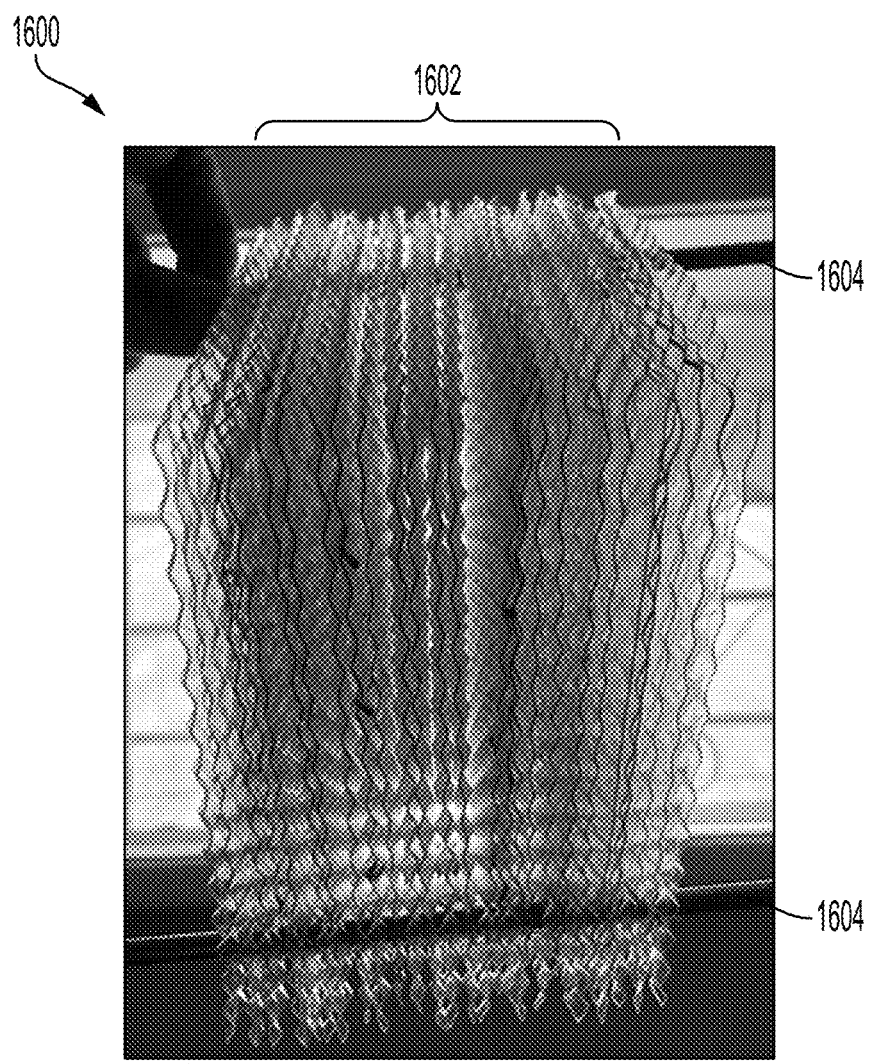
FIG. 16 is an image showing aspects of an example interfacial surface structure.

FIG. 16 is an image showing aspects of an example interfacial surface structure 1600. The example interfacial surface structure 1600 includes a set of contactor sheets 1602 assembled on two assembly rails 1604. The contactor sheets may be implemented as the contactor sheets 114, 302, 502, 602, 702, 802, 902, 1002, 1302 shown in FIGS. 1, 3A-3C, 5-10, and 13 or in another manner.

FIGS. 17A-17B are schematic diagrams of example demister separators 1700, 1720. Each demister separator 1700, 1720 include an array of curvy channels 1702 having a first end 1704 and a second, opposite end 1706 extending along the Z direction, a gaseous exhaust enters the first end 1704 of the demister separator 1700, 1720, and the liquid droplets exit the first end of the demister separator 1700, 1720; and the demisted gas exhaust exits the second end 1706 of the demister separator 1700, 1720. In some instances, the demister separators 1700, 1720 may be implemented as the vertical demister separator 314B in FIGS. 3B-3C or in another manner. In some instances, the demister separators 1700, 1720 may also be implemented as the horizontal demister separator 314A in FIG. 3A. In this case, the first end 1704 and the second, opposite end 1706 of the array of curvy channels 1702 are configured along the X direction; and the gaseous exhaust enters the first end 1704 of the demister separator 1700, 1720, and the liquid droplets exit the first end 1704 of the demister separator 1700, 1720; and the demisted gas exhaust exits the second end 1706 of the demister separator 1700, 1720. In some instances, surfaces of the array of curvy channels 1702 of the demister separator 1700, 1720 are hydrophobic having a contact angle equal to or greater than 75 degrees As shown in FIGS. 17A-17B, the shape of the cross section of the channels of the example demister separators 1700, 1720 is square. In certain instances, the shape of the cross section of the channels of the example separators 1700, 1720 may be circular, hexagonal, or another shape. In certain examples, the demister separators 1700, 1720 may be fabricated using a 3D printing process or in another manner.

Figure 18:
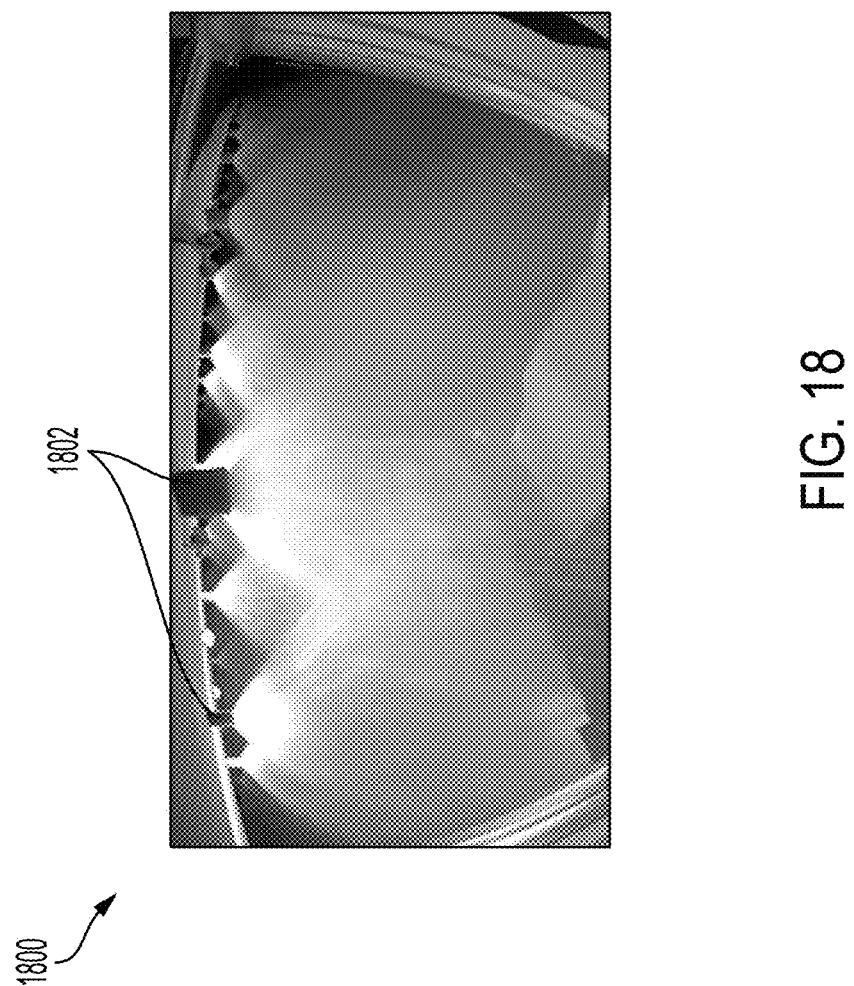
FIG. 18 is an image showing aspects of an example gas-liquid contactor.

FIG. 18 is an image showing aspects of an example gas-liquid contactor 1800. As shown in FIG. 18, the example gas-liquid contactor 1800 includes multiple liquid distributors 1802. The liquid distributors 1802 include nozzles configured to provide better distribution of an alkaline capture solution, and thus a better wetting of surfaces of interfacial surface structure (e.g., the interfacial surface structure 114, 302, 500, 600, 700, 800, 900, 1000, 1100, 1200, 1300, 1900 as shown in FIGS. 1, 3A-3C, 5-13, 19A-19B), allows a better utilization of the existing geometrical surface for the mass transfer.

Figure 19A:
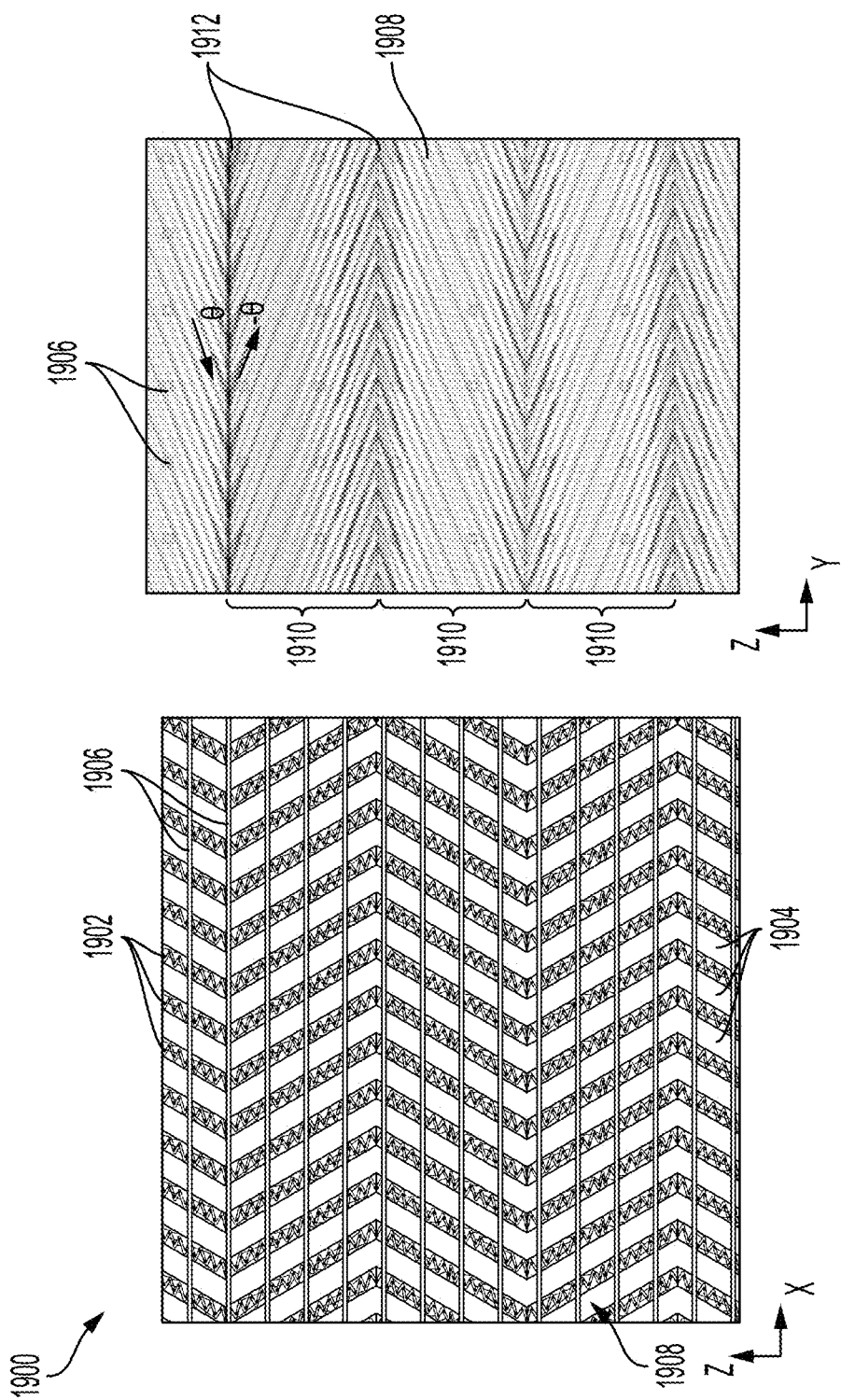
FIG. 19A is a diagram of an example interfacial surface structure having a fishbone profile.
Figure 19B:
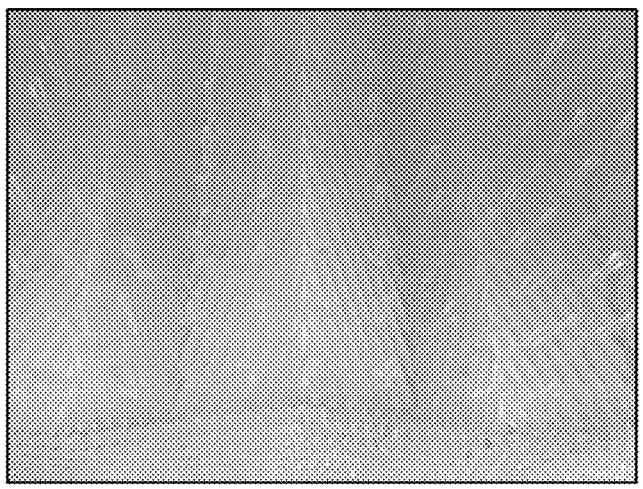
FIG. 19B is a set of images showing example interfacial surface structures having a fishbone profile.
Figure 19B:
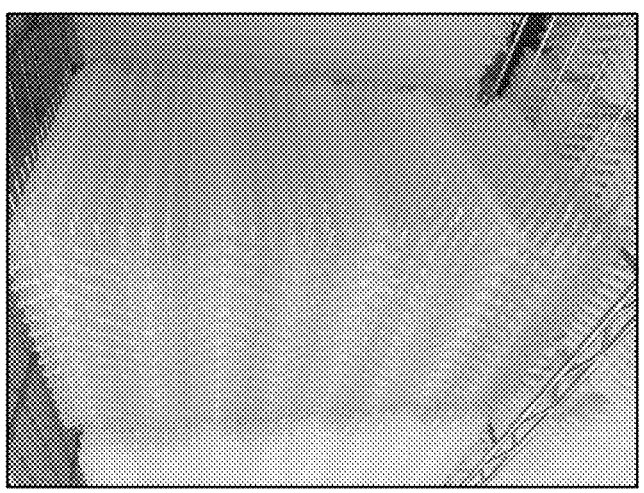
Figure 19B:
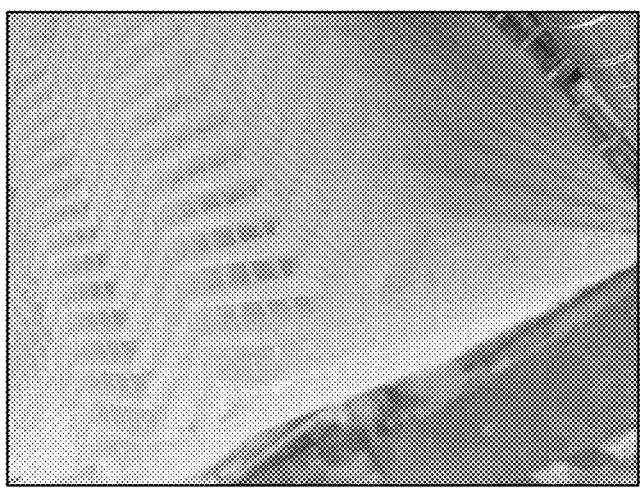

FIGS. 19A-19B include schematic diagrams and images showing aspects of an example interfacial surface structure 1900. The example interfacial surface structure 1900 includes a reticulate structure defined by multiple contactor sheets 1902. Neighboring contactor sheets 1902 are assembled in a face-to-face fashion separated by a uniform spacing 1904. The multiple contactor sheets 1902 of the interfacial surface structure 1900 are bonded to one another via respective supporting structures 1906. The example interfacial surface structure 1900 can lower pressure drop, increase surface area, prevent over-concentration of chemistry, improve the liquid retention time, promote greater randomness and spread in wetting, and other potential advantages.

As shown in FIG. 19A, each contactor sheet 1902 is a continuous solid; and is defined by a periodic surface structure with a zigzag profile in the X-Z plane oscillating along the Z direction; and each contactor sheet 1902 includes ridges 1912 extending along the Y direction. The ridges 1912 divide a contactor sheet 1902 into multiple sections 1910. As further shown in FIG. 19A, each section 1910 of the contactor sheet 1902 has a corrugated texture forming flutes 1908 extending in a flute direction offset from the extension direction of the ridges 1912. In other words, the flute direction 1910 is neither perpendicular nor parallel to the extension direction of the ridges 1912. In some implementations, the flutes 1908 in the same section 1910 have the same offset angles ($|\theta|$) which may be in a range of 0-90 degrees. In particular, the offset angles between the flutes 1908 on neighboring sections 1910 and the shared common ridge 1912 have opposite signs (e.g., $\theta$ and $-\theta$), forming a fishbone profile along the Y-Z plane.

The contactor sheets 1902 in the interfacial surface structure 1900 are parallel to one another, allowing for a denser packing of the contactor sheets 1902 without significant pressure drop or interference. The spacing 1904 between two neighboring contactor sheets 1902 and the flutes 1908 defines channels where gas and liquid phases flow and contact each other. As shown in FIG. 19A, the corrugated texture of each section 1910 has a secondary zigzag profile along the X-Z plane having sharp corners. In certain instances, the second zigzag profile of the corrugated texture has rounded corners; or the corrugated texture may have another profile. In some instances, the example interfacial surface structure 1900 may be implemented as the interfacial surface structure 114, 202, 302 in FIGS. 1 and 3A-3C or in another manner; and may be operated to perform operations in the example process 400 FIG. 4 to remove $CO_2$ gas in a gaseous feed or in another manner.

In some implementations, the interfacial surface structure 1900, when being configured in a gas-liquid contactor, are arranged such that the gaseous feed flow along the Z or Y direction in the channels defined by the spacing 1904 between neighboring contactor sheets 1902, and the alkaline capture solution flows downwardly in the flutes 1908 on the surfaces of the contactor sheets 1902.

In some instances, the interfacial surface structure 1900 may be fabricated using a 3D printing process, thermoforming, or another process. FIG. 19B show images of an example interfacial surface structure 1900 fabricated using a 3D printing process. In some implementations, the interfacial surface structure 1900 includes contactor sheets in a stacked chevron pattern. The angle of the chevrons' vertex can be, for example, in the range of 40-160°. In the example shown, each of the pitches has flutes 1908 that are angled at 5-85° from the horizontal. In some examples, the thickness of each contactor sheet 1902 is in the range of 0.025-2 mm, and the spacing 1904 between contactor sheets 1902 is in the range of 0.1-5 mm.

Figure 20C:
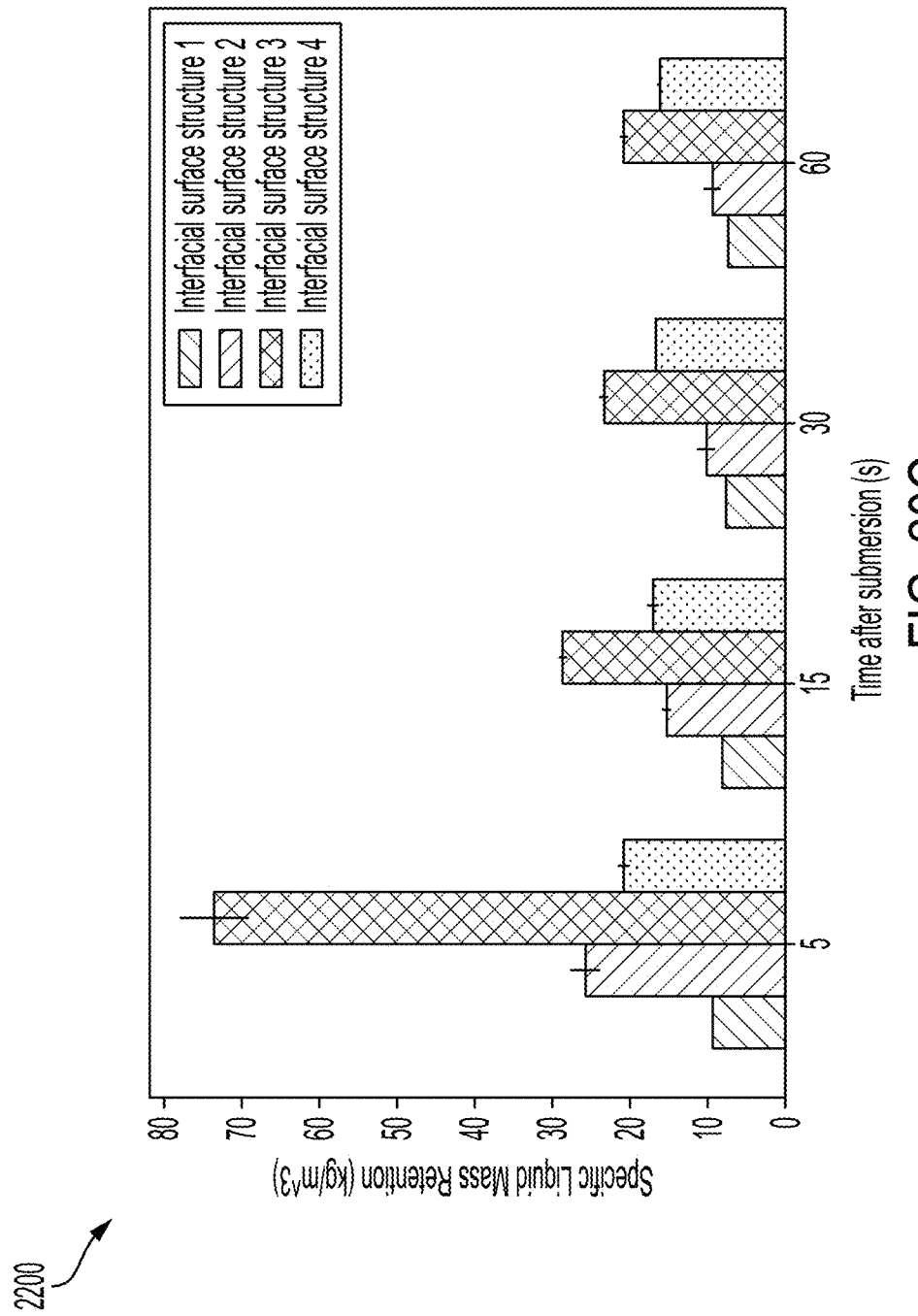
FIG. 20C is a plot showing specific liquid mass retention of various example interfacial surface structures at different times.

FIGS. 20A-20C are tables and plots comparing specific surface areas, specific liquid mass retention, and liquid retention time of various interfacial surface structures. Four interfacial surface structures were compared including a commercially available interfacial surface structure (CF1200) by Brentwood (interfacial surface structure #1), and the interfacial surface structures shown in FIGS. 8 (interfacial surface structure #2), 19A-19B (interfacial surface structure #3), and 5 (interfacial surface structure #4). The specific liquid mass retention in the interfacial surface structures at 5, 15, 30, and 60 seconds are measured and shown in FIGS. 20B-20C. Each of these measurements are conducted on a fixed unit volume of 0.1524 m×0.1524 m×0.3048 m (W×L×H).

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

In a general aspect, a carbon processing system for carbon removal from a gaseous feed is presented.

In a first example, a method of removing $CO_2$ gas from a gaseous feed includes wetting surfaces of interfacial surface structure in a gas-liquid contactor with an alkaline capture solution. The interfacial surface structure has a specific liquid mass retention at sixty seconds ($SLMR_{t=60s}$) in a range of 10-300 kg/m$^3$. The gaseous feed containing the $CO_2$ gas is passed across the wetted surfaces of the interfacial surface structure to dissolve the $CO_2$ gas in the alkaline capture solution. A $CO_2$-rich alkaline capture solution is collected from the gas-liquid contactor. The $CO_2$-rich alkaline capture solution includes dissolved $CO_2$ gas from the gaseous feed.

Implementations of the first example may include one or more of the following features. The interfacial surface structure has a specific liquid mass retention at five seconds ($SLMR_{t=5s}$) in a range of 20-500 kg/m$^3$. The interfacial surface structure has a specific surface area in a range of 400-5,000 square meters per cubic meter (m$^2$/m$^3$). The method includes receiving the gaseous feed having an intake absolute pressure equal to or less than 110 kilopascals (kPa). A concentration of the $CO_2$ gas in the gaseous feed is equal to or less than 1000 parts per million (PPM), and the gaseous feed comprises ambient air. The interfacial surface structure forms a reticulated structure. The reticulated structure is defined by a plurality of contactor sheets, and each of the contactor sheets has an egg crate profile. The reticulated structure is defined by a plurality of contactor sheets, and each of the contactor sheets has a jagged wedge profile. The reticulated structure is defined by a plurality of contactor sheets that have interlocking fins. The reticulated structure is defined by a plurality of contactor sheets; and each of the contactor sheets has a staggered hemi-ovoid profile. The reticulated structure is defined by a plurality of contactor sheets, and each of the contactor sheets has a pyramid profile. The reticulated structure is defined by a plurality of contactor sheets, and each of the contactor sheets has a fishbone profile. The reticulated structure is an extruded twisting hexagonal structure. The reticulated structure is a gyroid lattice structure.

Implementations of the first example may include one or more of the following features. The gaseous feed is received into the gas-liquid contactor through an inlet of the gas-liquid contactor. The gaseous feed comprises ambient air. The method includes separating dissolved $CO_2$ gas from the $CO_2$-rich alkaline capture solution. Separating the dissolved $CO_2$ gas from the $CO_2$-rich alkaline capture solution includes heating the $CO_2$-rich alkaline capture solution to a temperature sufficient to separate the $CO_2$ gas.

Implementations of the first example may include one or more of the following features. The interfacial surface structure includes a set of contactor sheets. The set of contact sheets is packed with one another and separated by spacers that define spacings between neighboring contactor sheets. One or more of the set of contactor sheets define a through hole. The interfacial surface structure is wetted by gravity-driven downward flow of the alkaline capture solution on surfaces of the contactor sheets, and the gaseous feed cross flows upward within the gaps defined between neighboring contactor sheets in the gas-liquid contactor. The set of contactor sheets is a first set of contactor sheets, wetting the interfacial surface structure includes wetting the first set of contactor sheets and a second set of contactor sheets, the second set of contactor sheets are configured in tandem with the first set of contactor sheets, and passing the gaseous feed containing the $CO_2$ gas across the wetted gas-liquid contactor includes passing the gaseous feed across the first set of contactor sheets; and after passing the gaseous feed across the first set of contactor sheets, passing output of the first set of contactor sheet across the second set of contactor sheets.

Implementations of the first example may include one or more of the following features. Each contactor sheet in the gas-liquid contactor comprises Polyvinyl Chloride (PVC), Polyethylene terephthalate (PET), Acrylic polymer, or epoxide polymer. Each contactor sheet in the gas-liquid contactor is hydrophilic having a contact angle in a range of 20-85 degrees.

Implementations of the first example may include one or more of the following features. The method further includes generating a gaseous exhaust by passing the gaseous feed through the wetted gas-liquid contactor; and aggregating mist in the gaseous exhaust into liquid droplets in a demister separator. The demister separator includes an array of channels having a first end and a second, opposite end, the gaseous exhaust enters the first end of the demister separator, and the liquid droplets exit the first end of the demister separator. Surfaces of the array of channels of the demister separator are hydrophobic having a contact angle in a range of 75-180 degrees. The alkaline capture solution comprises a phase transfer catalyst dissolved in water. The alkaline capture solution includes an aqueous ionic base ($M^+Y^-$), a carboxylic acid salt of amino acid, and a phase transfer catalyst. The alkaline capture solution includes at least one of an antifoaming agent or an anti-corrosive agent. The alkaline capture solution includes at least one of glycerol or polyglycols.

In a second example, a system for removing carbon dioxide ($CO_2$) gas from a gaseous feed, the system includes a gas-liquid contactor, an air mover, and a reservoir. The gas-liquid contactor includes an interfacial surface structure having a specific liquid mass retention at sixty seconds ($SLMR_{t=60s}$) in a range of 10-300 kg/m$^3$. Surface of the interfacial surface structure configured to receive an alkaline capture solution to form wetted surfaces. The air mover is configured to pass the gaseous feed across the wetted surfaces of the interfacial surface structure to dissolve the $CO_2$ gas in the alkaline capture solution. The reservoir is configured to collect a $CO_2$-rich alkaline capture solution from the gas-liquid contactor. The $CO_2$-rich alkaline capture solution includes dissolved $CO_2$ gas from the gaseous feed.

Implementations of the second example may include one or more of the following features. The interfacial surface structure has a specific liquid mass retention at five seconds ($SLMR_{t=5s}$) in a range of 20-500 kg/m³. The interfacial surface structure has a specific surface area in a range of 400-5,000 square meters per cubic meter (m²/m³). The method includes receiving the gaseous feed having an intake absolute pressure equal to or less than 110 kPa. A concentration of the $CO_2$ gas in the gaseous feed is equal to or less than 1000 parts per million (PPM), and the gaseous feed comprises ambient air. The interfacial surface structure forms a reticulated structure. The reticulated structure is defined by a plurality of contactor sheets, and each of the contactor sheets has an egg crate profile. The reticulated structure is defined by a plurality of contactor sheets, and each of the contactor sheets has a jagged wedge profile. The reticulated structure is defined by a plurality of contactor sheets that have interlocking fins. The reticulated structure is defined by a plurality of contactor sheets; and each of the contactor sheets has a staggered hemi-ovoid profile. The reticulated structure is defined by a plurality of contactor sheets, and each of the contactor sheets has a pyramid profile. The reticulated structure is defined by a plurality of contactor sheets, and each of the contactor sheets has a fishbone profile. The reticulated structure is an extruded twisting hexagonal structure. The reticulated structure is a gyroid lattice structure.

Implementations of the second example may include one or more of the following features. The gaseous feed includes ambient air. The system further includes a stripping column configured to receive the $CO_2$-rich alkaline capture solution from the reservoir; and to separate the dissolved $CO_2$ gas from the $CO_2$-rich alkaline capture solution. The stripping column includes a heating element configured to be used to heat the $CO_2$-rich alkaline capture solution to a temperature sufficient to separate the $CO_2$ gas.

Implementations of the second example may include one or more of the following features. The interfacial surface structure includes a set of contactor sheets. The set of contact sheets are packed with one another and separated by spacers that define spacings between neighboring contactor sheets. One or more of the set of contactor sheets define a through hole. The interfacial surface structure is wetted by gravity-driven downward flow of the alkaline capture solution on surfaces of the contactor sheets. The gaseous feed cross flows upward within the gaps defined between neighboring contactor sheets in the gas-liquid contactor.

Implementations of the second example may include one or more of the following features. The set of contactor sheets is a first set of contactor sheets with a first specific liquid mass retention. The interfacial surface structure includes a second, distinct set of contactor sheets with a second, distinct specific liquid mass retention The second, distinct set of contactor sheets are configured in tandem with the first set of contactor sheets and configured to receive output of the first set of contact sheets. Each contactor sheet in the gas-liquid contactor comprises Polyvinyl Chloride (PVC), Polyethylene terephthalate (PET), Acrylic polymer, or epoxide polymer. Each contactor sheet in the gas-liquid contactor is hydrophilic having a contact angle in a range of 20-85 degrees.

Implementations of the second example may include one or more of the following features. The system further includes a demister separator configured to receive a gaseous exhaust generated by passing the gaseous feed through the wetted gas-liquid contactor and to aggregate mist in the gaseous exhaust into liquid droplets. The demister separator includes an array of channels having a first end and a second, opposite end. The gaseous exhaust enters the first end of the demister separator; and the liquid droplets exit the first end of the demister separator. Surfaces of the array of channels of the demister separator are hydrophobic having a contact angle in a range of 75-180 degrees. The alkaline capture solution includes a phase transfer catalyst dissolved in water. The alkaline capture solution includes a quaternary ammonium hydroxide ($Q^+X^-$), a free amino acid or carboxylic acid salts of amino acid; and an aqueous ionic base ($M^+Y^-$), The alkaline capture solution includes at least one of an anti-foaming agent or an anti-corrosive agent. The alkaline capture solution includes at least one of glycerol or polyglycols.

In a third example, a method of removing $CO_2$ gas from a gaseous feed includes wetting surfaces of interfacial surface structure in a gas-liquid contactor with an alkaline capture solution. The interfacial surface structure has a specific liquid mass retention at sixty seconds ($SLMR_{t=5s}$) in a range of 20-500 kg/m³. The gaseous feed containing the $CO_2$ gas is passed across the wetted surfaces of the interfacial surface structure to dissolve the $CO_2$ gas in the alkaline capture solution. A $CO_2$-rich alkaline capture solution is collected from the gas-liquid contactor. The $CO_2$-rich alkaline capture solution includes dissolved $CO_2$ gas from the gaseous feed.

Implementations of the third example may include one or more of the following features. The interfacial surface structure forms a reticulated structure. The reticulated structure is defined by a plurality of contactor sheets, and at least one of the contactor sheets has at least one of: an egg crate profile; a jagged wedge profile; interlocking fins; a staggered hemi-ovoid profile; a pyramid profile; or a fishbone profile.

In a fourth example, a system for removing carbon dioxide ($CO_2$) gas from a gaseous feed, the system includes a gas-liquid contactor, an air mover, and a reservoir. The gas-liquid contactor includes an interfacial surface structure having a specific liquid mass retention at sixty seconds ($SLMR_{t=5s}$) in a range of 20-500 kg/m³. Surface of the interfacial surface structure configured to receive an alkaline capture solution to form wetted surfaces. The air mover is configured to pass the gaseous feed across the wetted surfaces of the interfacial surface structure to dissolve the $CO_2$ gas in the alkaline capture solution. The reservoir is configured to collect a $CO_2$-rich alkaline capture solution from the gas-liquid contactor. The $CO_2$-rich alkaline capture solution includes dissolved $CO_2$ gas from the gaseous feed.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A system for removing carbon dioxide ($CO_2$) gas from a gaseous feed, the system comprising:
   a gas-liquid contactor comprising an interfacial surface structure having a specific liquid mass retention at sixty seconds ($SLMR_{t=60s}$) in a range of 10-300 kg/m$^3$;
   a liquid distributor positioned to direct an alkaline capture solution toward the interfacial surface structure;
   an air mover positioned to pass the gaseous feed across surfaces of the interfacial surface structure to dissolve the $CO_2$ gas in the alkaline capture solution; and
   a first reservoir positioned to collect a $CO_2$-rich alkaline capture solution from the gas-liquid contactor, the $CO_2$-rich alkaline capture solution containing dissolved $CO_2$ gas from the gaseous feed.

2. The system of claim 1, wherein the interfacial surface structure has a specific liquid mass retention at five seconds ($SLMR_{t=5s}$) in a range of 20-500 kg/m$^3$.

3. The system of claim 1, wherein the interfacial surface structure has a specific surface area in a range of 400-5000 square meters per cubic meter (m$^2$/m$^3$).

4. The system of claim 1, wherein a concentration of the $CO_2$ gas in the gaseous feed is equal to or less than 1000 parts per million.

5. The system of claim 1, wherein the gas-liquid contactor comprises an inlet, the air mover is configured to direct the gaseous feed into the gas-liquid contactor through the inlet, and the intake absolute pressure of the gaseous feed at the inlet is less than or equal to 110 kPa.

6. The system of claim 1, wherein the gaseous feed comprises a flue gas, and a concentration of the $CO_2$ gas in the gaseous feed is in a range of 1 to 20 percent in weight.

7. The system of claim 1, wherein the interfacial surface structure forms a reticulated structure.

8. The system of claim 7, wherein the reticulated structure is defined by a plurality of contactor sheets, and at least one of the contactor sheets has an egg crate profile.

9. The system of claim 7, wherein the reticulated structure is defined by a plurality of contactor sheets, at least one of the contactor sheets has a jagged wedge profile.

10. The system of claim 7, wherein the reticulated structure is defined by a plurality of contactor sheets that have interlocking fins.

11. The system of claim 7, wherein the reticulated structure is defined by a plurality of contactor sheets, at least one of the contactor sheets has a staggered hemi-ovoid profile.

12. The system of claim 7, wherein the reticulated structure is defined by a plurality of contactor sheets, and at least one of the contactor sheets has a pyramid profile.

13. The system of claim 7, wherein the reticulated structure is defined by a plurality of contactor sheets, and at least one of the contactor sheets has a fishbone profile.

14. The system of claim 7, wherein the reticulated structure is an extruded twisting hexagonal structure.

15. The system of claim 7, wherein the reticulated structure is a gyroid lattice structure.

16. The system of claim 1, wherein the alkaline capture solution comprises:
   an aqueous ionic base ($M^+Y^-$),
   a phase transfer catalyst, and
   a carboxylic acid salt of amino acid.

17. A system for removing carbon dioxide ($CO_2$) gas from a gaseous feed, the system comprising:
   a gas-liquid contactor comprising an interfacial surface structure having a specific liquid mass retention at five seconds ($SLMR_{t=5s}$) in a range of 20-500 kg/m$^3$;
   a liquid distributor positioned to direct an alkaline capture solution toward the interfacial surface structure;
   an air mover positioned to pass the gaseous feed across surfaces of the interfacial surface structure to dissolve the $CO_2$ gas in the alkaline capture solution; and
   a first reservoir positioned to collect a $CO_2$-rich alkaline capture solution from the gas-liquid contactor, the $CO_2$-rich alkaline capture solution containing dissolved $CO_2$ gas from the gaseous feed.

18. The system of claim 17, wherein the interfacial surface structure forms a reticulated structure.

19. The system of claim 18, wherein the reticulated structure is defined by a plurality of contactor sheets, and at least one of the contactor sheets has at least one of:
   an egg crate profile;
   a jagged wedge profile;
   interlocking fins;
   a staggered hemi-ovoid profile;
   a pyramid profile; or
   a fishbone profile.

20. The system of claim 17, wherein the alkaline capture solution comprises:
   an aqueous ionic base ($M^+Y^-$),
   a phase transfer catalyst, and
   a carboxylic acid salt of amino acid.

* * * * *